United States Patent
Axmon et al.

(10) Patent No.: US 9,762,343 B2
(45) Date of Patent: Sep. 12, 2017

(54) INTERFERENCE REJECTION FOR IMPROVED CELL DETECTION

(71) Applicant: Telefonaktiebolaget L M Ericsson (publ), Stockholm (SE)

(72) Inventors: Joakim Axmon, Kävlinge (SE); Peter Alriksson, Hörby (SE); Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 28 days.

(21) Appl. No.: 14/694,604

(22) Filed: Apr. 23, 2015

(65) Prior Publication Data

US 2016/0226612 A1    Aug. 4, 2016

Related U.S. Application Data

(60) Provisional application No. 62/110,166, filed on Jan. 30, 2015.

(51) Int. Cl.
*H04W 4/00* (2009.01)
*H04J 11/00* (2006.01)
(Continued)

(52) U.S. Cl.
CPC ............. *H04J 11/005* (2013.01); *H04B 7/08* (2013.01); *H04J 11/0069* (2013.01);
(Continued)

(58) Field of Classification Search
CPC .. H04J 11/005; H04J 11/0069; H04J 11/0086; H04W 48/16; H04W 56/0015; H04B 7/08
See application file for complete search history.

(56) References Cited

U.S. PATENT DOCUMENTS 5,260,968 A * 11/1993 Gardner ................ H01Q 3/242
                                                 375/347
5,566,209 A * 10/1996 Forssen ............... H01Q 3/2605
                                                 375/262
(Continued)

FOREIGN PATENT DOCUMENTS

CN         104185256 A       12/2014
EP          2214439 A1        8/2010
(Continued)

OTHER PUBLICATIONS

International Search Report and Written Opinion for International Patent Application No. PCT/EP2016/051878, mailed Apr. 25, 2016, 9 pages.
(Continued)

*Primary Examiner* — Kevin Mew
(74) *Attorney, Agent, or Firm* — Withrow & Terranova, PLLC

(57) ABSTRACT

Systems and methods are disclosed for detecting one or more predefined signals while suppressing interference. In some embodiments, a method of operation of a wireless device in a wireless network to detect a predetermined signal in the presence of interference comprises detecting one or more first cells and detecting one or more predetermined signals from a second cell while spatially filtering transmissions from one or more perceived directions of the one or more first cells, respectively. In this manner, detection of the one or more predefined signals from the second cell is improved. In some embodiments, the one or more first cells are strong relative to the weaker second cell.

27 Claims, 16 Drawing Sheets

(51) Int. Cl.
*H04W 48/16* (2009.01)
*H04W 56/00* (2009.01)
*H04B 7/08* (2006.01)

(52) U.S. Cl.
CPC ......... *H04J 11/0086* (2013.01); *H04W 48/16* (2013.01); *H04W 56/0015* (2013.01)

(56) References Cited

U.S. PATENT DOCUMENTS

| | | | | |
|---|---|---|---|---|
| 5,615,409 | A * | 3/1997 | Forssen | H04W 16/28 455/440 |
| 6,115,409 | A * | 9/2000 | Upadhyay | H01Q 3/2605 370/487 |
| 6,304,760 | B1 * | 10/2001 | Thomson | H04B 17/309 455/503 |
| 6,640,115 | B1 | 10/2003 | Fujimoto et al. | |
| 6,898,235 | B1 * | 5/2005 | Carlin | H04B 1/001 342/147 |
| 6,950,678 | B1 * | 9/2005 | Mujtaba | H04W 16/32 342/368 |
| 7,855,992 | B2 * | 12/2010 | Xu | H04B 7/084 370/334 |
| 7,983,197 | B2 | 7/2011 | Axmon et al. | |
| 8,102,956 | B2 * | 1/2012 | Dai | H01Q 1/242 375/267 |
| 8,248,993 | B2 * | 8/2012 | Cai | H04B 7/0452 370/328 |
| 2002/0051436 | A1 * | 5/2002 | Ertel | H01Q 1/246 370/335 |
| 2002/0057660 | A1 * | 5/2002 | Park | H01Q 1/246 370/335 |
| 2002/0071384 | A1 * | 6/2002 | Hall | H01Q 1/246 370/203 |
| 2002/0137538 | A1 | 9/2002 | Chen et al. | |
| 2003/0142756 | A1 * | 7/2003 | Kohno | H04B 7/0617 375/295 |
| 2003/0236108 | A1 * | 12/2003 | Li | H04B 7/0408 455/562.1 |
| 2004/0071207 | A1 * | 4/2004 | Skidmore | H03H 21/0043 375/233 |
| 2004/0243657 | A1 * | 12/2004 | Goren | G06T 1/0007 708/607 |
| 2004/0248519 | A1 | 12/2004 | Niemela | |
| 2008/0122627 | A1 * | 5/2008 | Chang | G06K 7/0008 340/572.7 |
| 2012/0087263 | A1 | 4/2012 | Li et al. | |
| 2012/0315938 | A1 | 12/2012 | Van Nee et al. | |
| 2013/0188499 | A1 | 7/2013 | Mach et al. | |
| 2013/0244594 | A1 * | 9/2013 | Alrabadi | H04B 7/0413 455/78 |
| 2013/0279437 | A1 * | 10/2013 | Ng | H04W 48/16 370/329 |
| 2014/0155072 | A1 | 6/2014 | Hellmann | |
| 2014/0286298 | A1 | 9/2014 | Yoshimoto et al. | |
| 2015/0063253 | A1 * | 3/2015 | Barbieri | H04L 5/0048 370/329 |
| 2015/0117341 | A1 | 4/2015 | Ohwatari et al. | |
| 2015/0341846 | A1 * | 11/2015 | Shi | H04W 48/16 455/434 |
| 2015/0365882 | A1 * | 12/2015 | Yang | H04W 48/16 455/434 |
| 2016/0315728 | A1 * | 10/2016 | Palenius | H04W 48/16 |

FOREIGN PATENT DOCUMENTS

| | | |
|---|---|---|
| EP | 2360967 B1 | 11/2011 |
| WO | 2013/056150 A1 | 4/2013 |
| WO | 2014/135204 A1 | 9/2014 |

OTHER PUBLICATIONS

Ericsson, "R4-152849: Modified arrangement for RRH based model," 3rd Generation Partnership Project (3GPP), TSG RAN WG4 Meeting #75, May 25-29, 2015, 8 pages, Fukuoka, Japan.

Non-Final Office Action for U.S. Appl. No. 14/693,649, mailed Mar. 11, 2016, 7 pages.

International Search Report and Written Opinion for International Patent Application No. PCT/EP2016/051888, mailed Mar. 16, 2016, 14 pages.

Author Unknown, "Technical Specification Group Radio Access Network; Evolved Universal Terrestrial Radio Access (E-UTRA); Requirements for support of radio resource management (Release 11)," Technical Specification 36.133, Version 11.11.0, 3GPP Organizational Partners, Dec. 2014, 813 pages.

Author Unknown, "Technical Specification Group Radio Access Network; Evolved Universal Terrestrial Radio Access (E-UTRA); Requirements for support of radio resource management (Release 12)," Technical Specification 36.133, Version 12.4.0, 3GPP Organizational Partners, Jul. 2014, 870 pages.

Author Unknown, "Technical Specification Group Radio Access Network; Evolved Universal Terrestrial Radio Access (E-UTRA);Physical channels and modulation (Release 12)," Technical Specification 36.211, Version 12.3.0, 3GPP Organizational Partners, Sep. 2014, 124 pages.

Lisheng, L. et al, "MAP Receiver with Spatial Filters for Suppressing Cochannel Interference in MIMO-OFDM Mobile Communications," IEEE 68th Vehicular Technology Conference, Sep. 21-24, 2008, pp. 1-5.

NTT DoCoMo, Inc. et al., "RP-142307: New SI proposal: Performance-enhancements for high speed scenario," 3rd Generational Partnership Project (3GPP), TSG RAN Meeting #66, Dec. 8-12, 2014, 7 pages, Maui, Hawaii.

Widrow, B. et al., "Adaptive Signal Processing," Prentice-Hall, Inc., 1985, pp. 372-383.

Final Office Action for U.S. Appl. No. 14/694,620, mailed Nov. 23, 2016, 14 pages.

Notice of Allowance for U.S. Appl. No. 14/693,649, mailed Sep. 27, 2016, 7 pages.

International Search Report and Written Opinion for International Patent Application No. PCT/EP2016/057409, mailed Jun. 20, 2016, 10 pages.

Non-Final Office Action for U.S. Appl. No. 14/694,620, mailed Jun. 24, 2016, 12 pages.

* cited by examiner

INTERFERENCE REJECTION FOR IMPROVED CELL DETECTION

RELATED APPLICATIONS

This application claims the benefit of provisional patent application Ser. No. 62/110,166, filed Jan. 30, 2015, the disclosure of which is hereby incorporated herein by reference in its entirety.

TECHNICAL FIELD

The present disclosure relates to cell detection in a cellular communications network.

BACKGROUND

In future releases of $4^{th}$ Generation (4G) wireless communications systems and with the introduction of $5^{th}$ Generation (5G) wireless communications systems, network deployment will gradually change from having been based predominantly on relatively sparsely placed macro and micro cells to a mix of macro cells and densely deployed small cells, so called femto and pico cells. The typical cell radius for each kind of cell is indicated in Table 1.

TABLE 1

Cell types and typical cell radii

| Cell Type | Radius |
|---|---|
| Macro | >2000 m |
| Micro | 200-2000 m |
| Pico | 10-200 m |
| Femto | 0-10 m |

In order for a User Equipment device (UE) in e.g. $3^{rd}$ Generation Partnership Project (3GPP) Long Term Evolution (LTE) systems to be able to operate in a small cell, the UE has to detect the small cell early to prepare the network node (e.g., enhanced or evolved Node B (eNB) or base station) for a potential handover to a new Primary Cell (PCell), Secondary Cell (SCell) configuration (in case of carrier aggregation), and/or Primary Secondary Cell (PSCell) configuration and activation (in case of dual connectivity). The time the small cell can be used by the UE depends for instance on: cell radius, UE speed, and whether range extension by means of enhanced Inter-Cell Interference Coordination (eICIC) or further eICIC (feICIC) is configured by the network node (e.g., the eNB).

Handover to a new PCell, configuration of a new SCell, and configuration and activation of a new PSCell is usually based on measurement reports from the UE, where the UE has been configured by the network node to send measurement reports periodically, at particular events, or a combination thereof. The measurement reports contain physical cell Identity (ID), reference signal strength (Reference Signal Received Power (RSRP)) and reference signal quality (Reference Signal Received Quality (RSRQ)) of the detected cells.

Cell detection by a UE, aiming at detecting and determining cell ID and cell timing of neighbor cells, e.g. in order to find candidates for handover, is facilitated by two signals that are transmitted in each Evolved Universal Terrestrial Radio Access Network (EUTRAN) cell on a 5 millisecond (ms) basis: the Primary and the Secondary Synchronization Signal (PSS and SSS, respectively). Moreover, Reference Signals (RSs) are transmitted in each cell in order to facilitate cell measurements and channel estimation.

In 3GPP LTE systems, the PSS exists in three versions, one for each out of three cell-within-group IDs, and is based on Zadoff-Chu sequences that are mapped onto the central 62 subcarriers and bordered by five unused subcarriers on either side. There are 168 cell groups in total, and information regarding the cell group to which a cell belongs is carried by the SSS, which is based on m-sequences. This signal also carries information on whether the used SSS is transmitted in subframe 0 or subframe 5, which is used for acquiring frame timing. For a particular cell, the SSS is further scrambled with the cell's cell-within-group ID. Hence there are 2×504 versions in total, two for each out of 504 physical layer cell identities. Similar to PSS, SSS is mapped onto the central 62 subcarriers and bordered by five unused subcarriers on either side. The time (subframe)-frequency (subcarrier) grid or layout of synchronization signals in a 3GPP LTE Frequency Division Duplex (FDD) radio frame is shown in FIG. 1. The shown radio frame is wider than the smallest downlink system bandwidth of 1.4 Megahertz (MHz) (72 subcarriers or 6 Resource Blocks (RBs)). Subframes 1-3 and 6-8 may be used for Multi-Broadcast Single Frequency Network (MBSFN) or may be signaled to do so for other purposes, by which a UE cannot expect reference signals in more than the first Orthogonal Frequency Division Multiplexing (OFDM) symbol. The Physical Broadcast Channel (PBCH) (carrying Master Information Block (MIB)) and synchronization signals are transmitted at prior known OFDM symbol positions over the central 72 subcarriers.

Detection of a cell is, as is well-known in the art, based on matched filtering by the UE using the three PSS versions over at least 5 ms of received samples. Correlation peaks in the filter output may reveal synchronization signals from one or more cells. This is referred to as symbol synchronization.

Upon having established symbol synchronization and identified the cell-within-group ID, the next step in cell detection is SSS detection to acquire frame timing and physical layer cell ID. After decoding the SSS, the cell group ID and thereby the full physical layer cell ID is acquired. Moreover, frame timing and cyclic prefix configuration are determined.

The pair of PSS and SSS is always transmitted from the same antenna port at the network node (e.g., eNB), but different pairs may be transmitted from different antenna ports (3GPP Technical Specification (TS) 36.211 V12.3.0, Section 6.11).

Existing methods of cell detection at a UE include:
- Non-coherent PSS detection, where matched filtering is carried out individually for each receiver branch, and then the received signal magnitudes (potentially squared to powers) of all receiver branches are added before peak detection is carried out.
- Coherent SSS detection, where after having established where the PSS is located in time, the same is used for estimating the radio channel for the cell-to-be-detected before coherently adding the SSS from the different receiver branches and carrying out decoding.
- Non-coherent SSS detection, where the timing information from PSS is used but no radio channel is estimated based on it.

Furthermore, each of these methods may also include interference cancellation of partially or fully overlapping signals from already detected cells (e.g., synchronization and reference signals that are determined from the physical cell ID of a detected cell; decoded and reconstructed PBCH, or other broadcasted channel of a detected cell), whereby the prior known signals are subtracted before carrying out the detection of PSS or decoding of SSS, see for instance commonly held and assigned International Publication No. WO 2014/135204 entitled CHANNEL ESTIMATION FOR INTERFERENCE CANCELLATION.

Network deployments are rapidly moving towards combinations of large and small cells, as illustrated in FIGS. 2A and 2B, where some frequency layers of the cell layout may contain only small cells (e.g., due to physical limitations at high frequencies—e.g., License-Assisted Access (LAA)), and other layers may contain a combination of overlapping large and small cells where the small cells are used to offload the large cells at particular spots (e.g., a Heterogeneous Network (HetNet)). FIGS. 2A and 2B illustrate a deployment scenario example with aggregation using five downlink carriers (F1, . . . , F5). Both HetNet and small cell scenarios introduce challenges for cell detection since the neighbor cells searched for may have very low Signal to Interference and Noise Ratio (SINR).

It is also foreseen that there will be dense deployment of small cells, e.g. in shopping malls, office buildings, airports etc., to provide high capacity to a large number of end users or subscribers (see FIGS. 3A and 3B which are an exemplary sketch of a small cell deployment in such an environment). Here too, cell detection is challenging due to high interference (low SINR).

SUMMARY

Systems and methods are disclosed for detecting one or more predefined signals while suppressing interference. In some embodiments, a method of operation of a wireless device in a wireless network to detect a predetermined signal in the presence of interference comprises detecting one or more first cells and detecting one or more predetermined signals from a second cell while spatially filtering transmissions from one or more perceived directions of the one or more first cells, respectively. In this manner, detection of the one or more predefined signals from the second cell is improved. In some embodiments, the one or more first cells are strong relative to the weaker second cell.

In some embodiments, the one or more predetermined signals from the second cell comprise a synchronization signal, a discovery signal, a reservation signal, and/or a reference signal.

In some embodiments, the one or more first cells comprise one or more serving cells of the wireless device. In some embodiments, the one or more first cells comprise one or more non-serving cells of the wireless device.

In some embodiments, detecting the one or more predetermined signals from the second cell while spatially filtering transmissions from the one or more perceived directions of the one or more first cells, respectively, comprises detecting the one or more predetermined signals from the second cell while spatially filtering transmissions of one or more interfering signals by the one or more first cells but not spatially filtering transmissions of one or more desired signals by the one or more first cells.

In some embodiments, detecting the one or more predetermined signals from the second cell while spatially filtering transmissions from the one or more perceived directions of the one or more first cells, respectively, comprises determining one or more sets of combining weights for spatially filtering transmissions from the one or more perceived directions of the one or more first cells and combining samples received via two or more active receive antennas of the wireless device according to the one or more sets of combining weights to thereby spatially filter transmissions from the one or more perceived directions of the one or more first cells.

In some embodiments, the two or more active receive antennas are a number (N) of active receive antennas where $N \geq 2$, the one or more first cells is a number (L) of first cells where $1 \leq L \leq N-1$, and the one or more sets of combining weights for spatially filtering transmissions from the one or more perceived directions of the one or more first cells is a single set of combining weights. In some embodiments, the single set of combining weights comprises, for each active receive antenna of the two or more active receive antennas, a single weight for a full frequency band in which transmissions from the one or more perceived directions of the one or more first cells are to be spatially filtered. In other embodiments, the single set of combining weights comprises, for each active receive antenna of the two or more active receive antennas, multiple weights for multiple subbands of a frequency band in which transmissions from the one or more perceived directions of the one or more first cells are to be spatially filtered.

In some embodiments, the two or more active receive antennas are a number (N) of active receive antennas where $N \geq 2$, the one or more first cells is a plurality (L) of first cells where $L > N-1$, and the one or more sets of combining weights for spatially filtering transmissions from the one or more perceived directions of the one or more first cells is two or more sets of combining weights. In some embodiments, combining the samples received via the two or more active receive antennas of the wireless device comprises combining the samples received via the two or more active receive antennas according to a first set of combining weights from the two or more sets of combining weights to provide a first combined sample in which transmissions from one or more perceived directions of a first subset of the plurality of first cells are spatially filtered and combining the samples received via the two or more active receive antennas according to a second set of combining weights from the two or more sets of combining weights to provide a second combined sample in which transmissions from one or more perceived directions of a second subset of the plurality of first cells are spatially filtered.

In some embodiments, the one or more predetermined signals comprise a Primary Synchronization Signal (PSS) of the second cell, and detecting the one or more predetermined signals from the second cell while spatially filtering transmissions from the one or more perceived directions of the one or more first cells comprises determining one or more sets of combining weights for spatially filtering transmissions from the one or more perceived directions of the one or more first cells and performing a process for detecting the PSS while spatially filtering transmissions from the one or more perceived directions of the one or more first cells using the one or more sets of combining weights. In some embodiments, the one or more predetermined signals further comprise a Secondary Synchronization Signal (SSS) of the second cell, and detecting the one or more predetermined signals from the second cell while spatially filtering transmissions from the one or more perceived directions of the one or more first cells comprises performing a process for detecting the SSS while spatially filtering transmissions from the one or more perceived directions of the one or more first cells using one of the one or more sets of combining weights that corresponds to a detected peak for the PSS when performing the process for detecting the PSS.

In some embodiments, detecting the one or more predetermined signals from the second cell while spatially filtering transmissions from the one or more perceived directions of the one or more first cells comprises estimating a radio channel for the one or more first cells, spatially combining received samples from two or more active receive antennas based on the radio channel such that transmissions from the one or more perceived directions of the one or more first cells are spatially filtered, and detecting the one or more predetermined signals from the second cell based on the spatially combined received samples.

In some embodiments, the method further comprises determining a number of active receive antennas for use when detecting the one or more predetermined signals from the second cell while spatially filtering transmissions from the one or more perceived directions of the one or more first cells, respectively. In some embodiments, the number of active receive antennas to use is less than all receive antennas of the wireless device.

In some embodiments, determining the number of active receive antennas for use when detecting the one or more predetermined signals from the second cell while spatially filtering transmissions from the one or more perceived directions of the one or more first cells, respectively, comprises determining the number of active receive antennas to use based on one or more criteria selected from a group consisting of: a number of one or more perceived directions to be spatially filtered, a mobility of the wireless device, a quality of the one or more first cells, signaling from the wireless network, configuration by the wireless network, one or more predefined conditions, serving cell configuration, and transmission mode.

Embodiments of a wireless device operative to detect a predetermined signal in the presence of interference are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

For dense deployment and small cell scenarios in cellular communications networks it is necessary to detect neighbor cells for potential handover/reselection early to avoid long handover interruption, radio link failure, or missed paging signals (pages). The scenarios very much look like high speed train scenarios in macro cell deployments in that the User Equipment device (UE) can only use the serving cell a very short time before the UE has to be handed over to a neighbor cell. If a neighbor cell cannot be identified before the UE reaches the cell border, the likelihood for the UE dropping a data connection or a call increases and it might not even be able to receive a handover command before losing connection to the serving cell.

The existing 3$^{rd}$ Generation Partnership Program (3GPP) requirements on mobility measurements and event triggering (captured in 3GPP Technical Specification (TS) 36.133 V11.11.0) have been derived with mobility at low speed in mind and for cells with a Signal to Interference and Noise Ratio (SINR) −6 decibels (dB) or higher unless enhanced Inter-Cell Interference Coordination (eICIC) or further eICIC (feICIC)—which both require tight coordination between cells and are only available in CONNECTED mode—is used. A UE implementation that just barely fulfills those requirements will face a big challenge in the new deployment scenarios; hence, methods that allow the cell detection to be improved without substantially impacting the UE complexity are needed.

Embodiments of systems and methods that address these problems are disclosed herein. In some embodiments, existing cell search functionality is extended by a new mode of operation where the UE can suppress or block transmissions from one or more of already detected cells, e.g. the serving cell and/or a strong neighbor cell, to improve the chance of detecting weak neighbor cells.

Notably, the embodiments described herein focus on 3GPP Long Term Evolution (LTE) systems and, as such, 3GPP LTE terminology (e.g., UE, Primary Synchronization Signal (PSS), and Secondary Synchronization Signal (SSS)) are oftentimes used. However, the present disclosure is not limited to 3GPP LTE and may be utilized in any suitable cellular communications network to improve synchronization signal detection. As such, more general terminology may be used (e.g., the term wireless device may be used as a more general term in lieu of UE).

Figure 1:
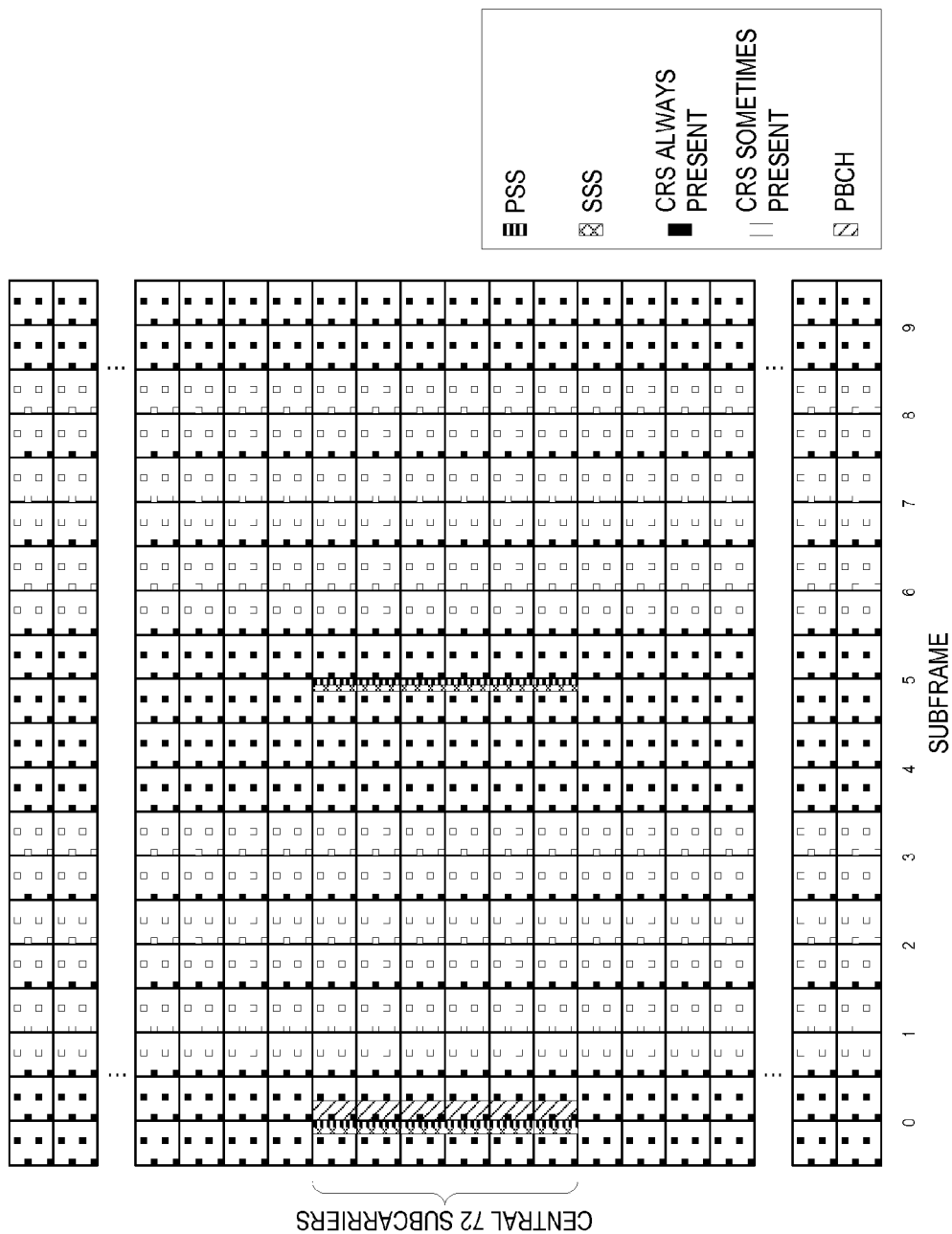
FIG. 1 illustrates a time-frequency grid of a legacy Long Term Evolution (LTE) Frequency Division Duplex (FDD) cell.
Figure 2A:
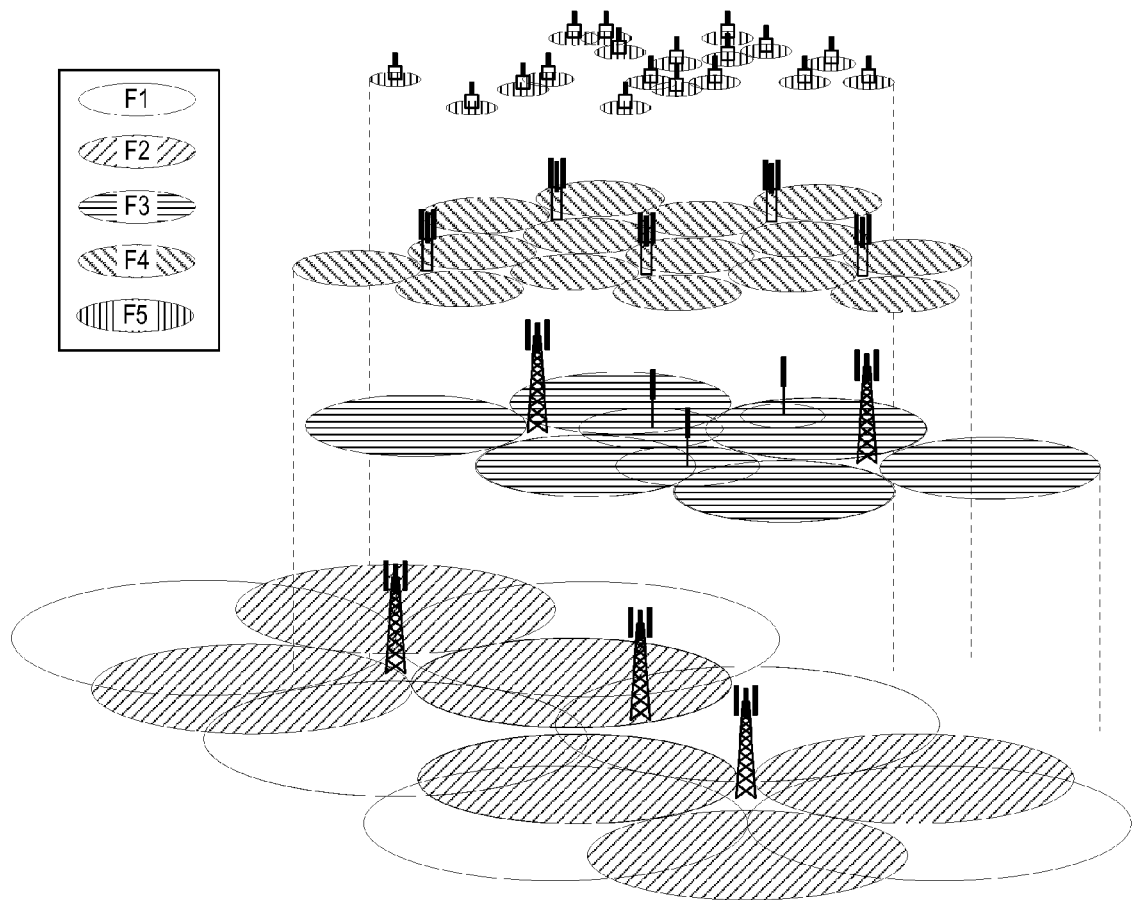
FIGS. 2A and 2B illustrate examples of a future deployment scenario with aggregation using five downlink carriers.
Figure 2B:
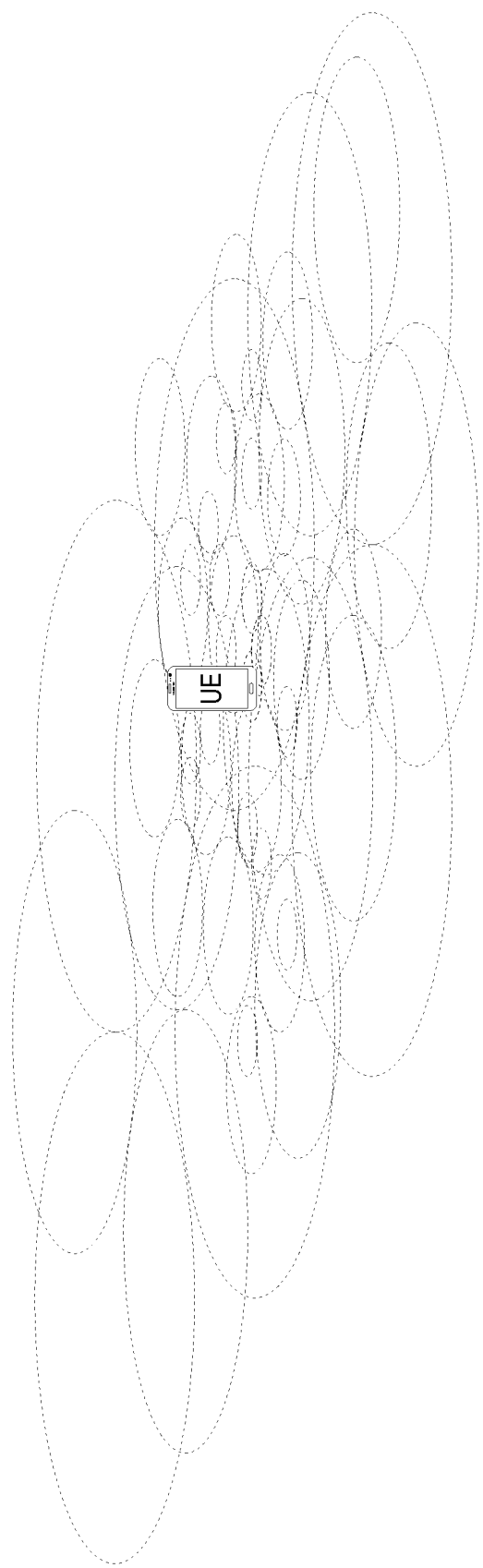
Figure 3A:
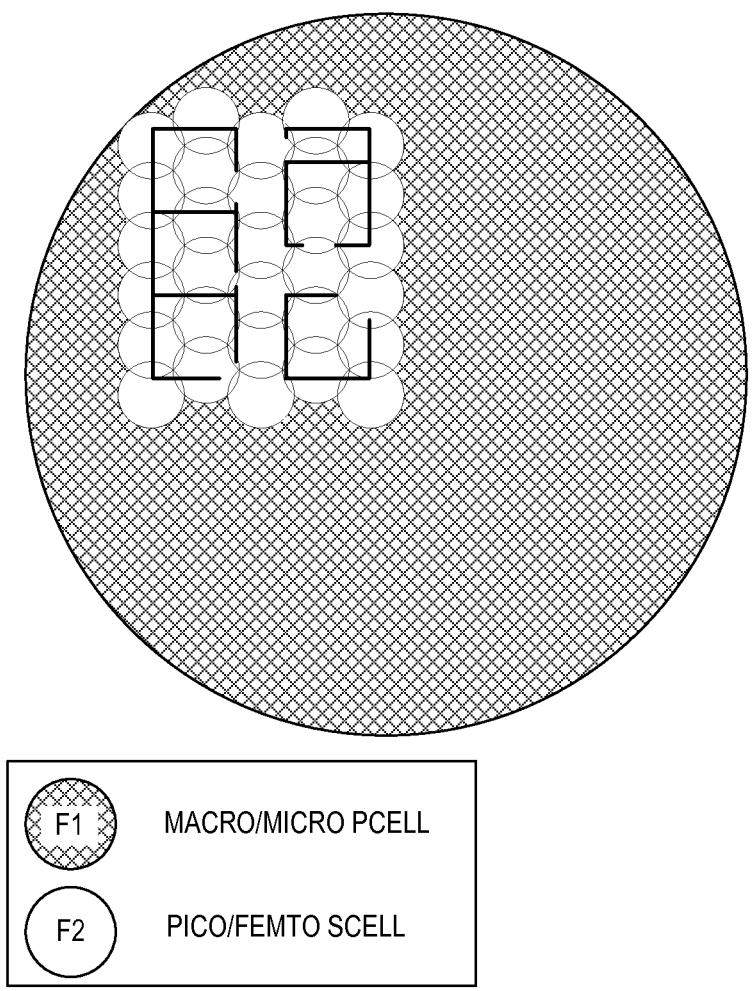
FIGS. 3A and 3B illustrate an exemplary sketch of a small cell deployment in a shopping mall or office building.
Figure 3B:
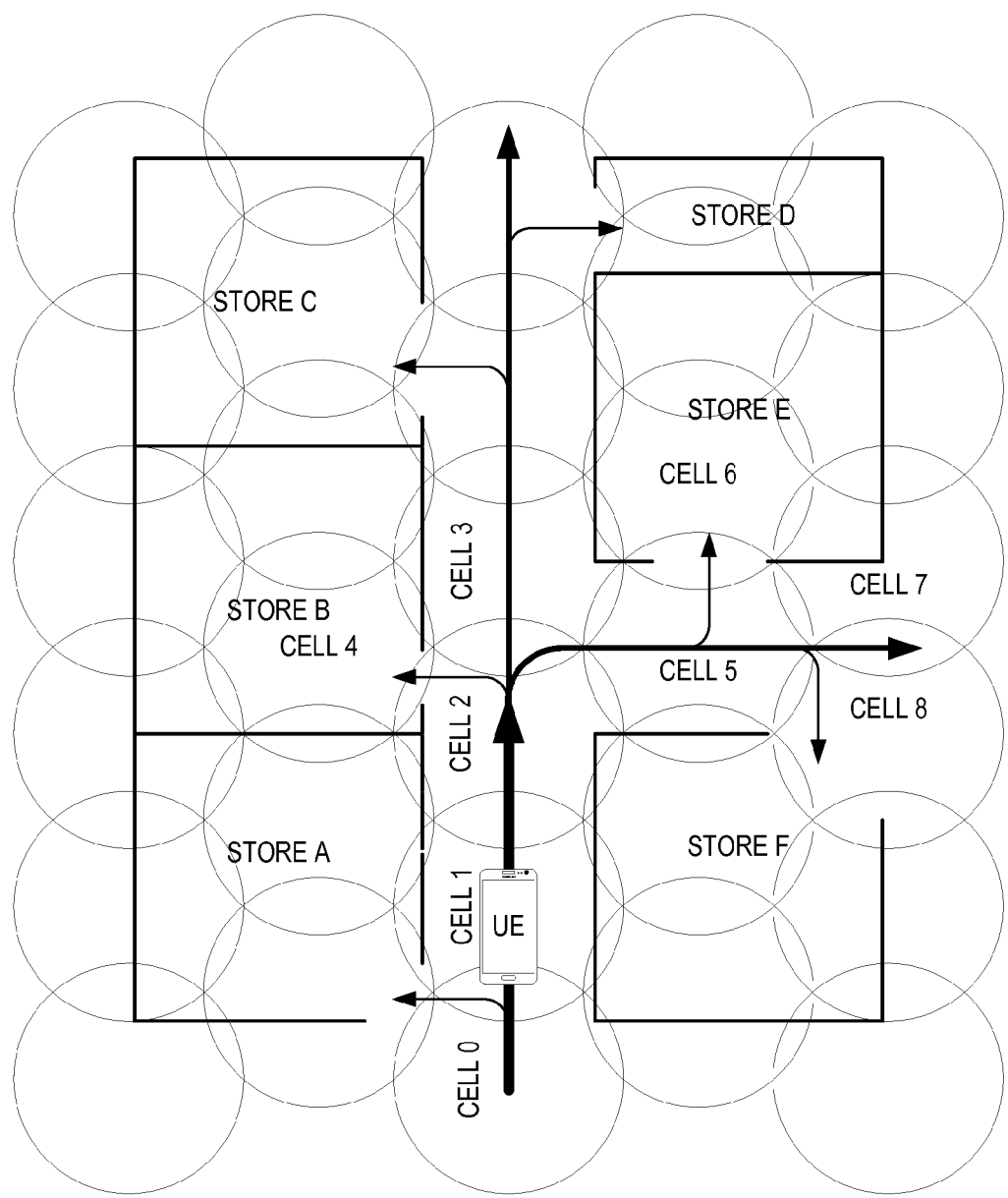
Figure 4:
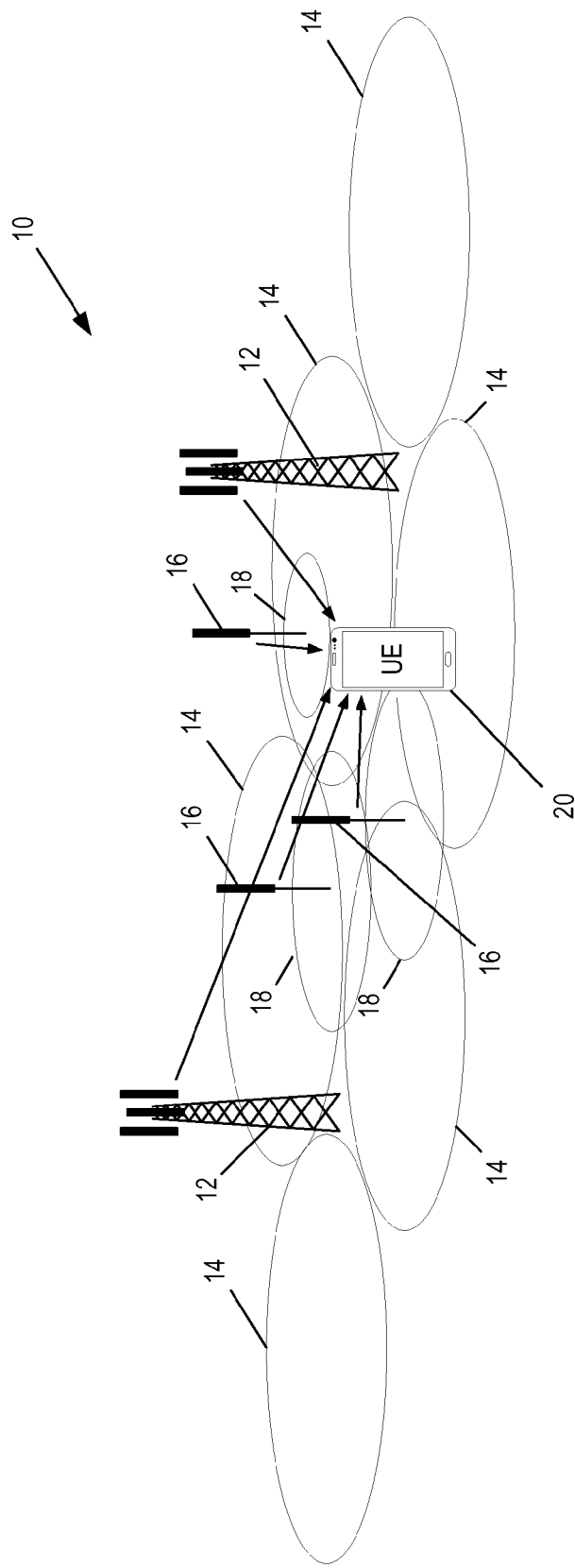
FIG. 4 illustrates one example of a cellular communications network in which signals from different cells impinge at different angles at a User Equipment device (UE) and, in order to suppress interference resulting from transmission of a predetermined signal(s) from a known, or previously detected, cell(s), the UE spatially filters transmissions from one or more perceived directions of the previously detected cell(s) according to some embodiments of the present disclosure.

FIG. 4 illustrates one example of a cellular communications network, or wireless system, 10 in which a UE operates to suppress interference during cell detection according to some embodiments of the present disclosure. In some embodiments, the cellular communications network 10 is a 3GPP LTE network and, as such, 3GPP LTE terminology is sometimes used herein. However, the present disclosure is not limited to 3GPP LTE. Rather, the concepts disclosed herein can be utilized to improve cell detection in any suitable type of cellular communications network.

As illustrated, a Radio Access Network (RAN) of the cellular communications network 10 includes a macro cell layer and a small cell layer. The macro cell layer includes a number of macro cell base stations 12 that serve corresponding macro cells 14. In LTE, the macro cell base stations 12 are referred to as enhanced or evolved Node Bs (eNBs). In this example, each of the macro cell base stations 12 serves three macro cells 14. The small cell layer includes a number of small cell base stations 16 that serve corresponding small cells 18. In LTE, the small cell base stations 16 may be referred to as micro base stations, pico base stations, femto base stations, home base stations (i.e., home eNBs), or the like.

A UE 20 is served by the cellular communications network 10. Notably, as used herein, a UE 20 is to be understood as any type of wireless device served by the cellular communications network 10 (e.g., a smart phone, a tablet computer, a machine-type communication device, a dongle, etc.). During cell detection, the UE 20 experiences interference, potentially from multiple different sources. For instance, if the UE 20 is attempting to detect relatively weak neighbor cells (e.g., one of the small cells 18) while being served by a strong cell (e.g., one of the macro cells 14), the UE 20 may experience known interference from the strong cell, which is a previously detected or known cell.

The desired and interfering signals impinge on the antennas of the UE 20 from different directions. In other words, the UE 20 will experience different radio propagation channels and directions of arrival for signals from different cells on the same carrier frequency. As described below, the UE 20 utilizes this fact to suppress transmissions from one or more perceived directions of transmissions of one or more predetermined, or predefined, signals from one or more previously detected cells 14, 18 during cell detection using a spatial filtering technique. As used herein, a perceived direction should be understood as being decoupled from geographic coordinates. A transmission impinges on a number (N) of receive antennas from a particular perceived direction if the same transmission received on two or more of the N receive antennas has a given phase difference. This phase difference corresponds to the perceived direction from which the transmissions impinge the N receive antennas. In case there is an inherent phase difference between antennas on the transmitter side (e.g., at the network node) and/or the receiver side (e.g., at the UE), the phase difference of the received signals will partly depend on said phase differences and partly on the direction from which the signals are received. For the general case of at least some of said phases being unknown to the UE, it cannot deduce the geographical direction although it perceives the signal as coming from a particular direction. The term "perceived direction" is used to emphasize that it can be different from a geographical direction.

Using the number (N) of receive antennas, the UE 20 can suppress at most N−1 perceived directions (relative phase difference between instances of a signal component received on two or more antennas, and possibly with a relative amplitude difference). When the UE 20 has identified one or more strong cells, the UE 20 can improve the chances of identifying weaker cells by suppressing transmissions coming from the already identified cells 14, 18.

Embodiments of the present disclosure are described in which suppressing such interfering transmissions is based on weighting and combining signals received on the different receive antennas of the UE 20 in such a manner that the interfering transmissions add up destructively, and ideally get annihilated (i.e., completely cancel one another). This may also have an impact on the desired signal components: in case those are impinging on the antennas with the same relative amplitude and phase as the interfering transmissions, they too will get annihilated as the UE 20 sees those coming essentially from the same direction as the interfering transmissions. For desirable signal components impinging from other directions (i.e., displaying amplitude and phase relations that are different from those of the undesirable transmissions) there might be degradation of the absolute amplitude but the SINR will increase due to reduced interference, and hence the likelihood of detecting the associated cell will improve.

In some embodiments, the UE 20 has only two receive antennas and, therefore, can only suppress transmissions from one direction. In order to improve the chances of detecting weak cells in the presence of more than one identified strong cell, the UE 20 may suppress the transmissions from strong cells one at a time, i.e., use two or more sets of the aforementioned weights.

In other embodiments, the UE 20 has more than two receive antennas and, as such, can suppress transmissions from up to N−1 directions, where N is the number of receive antennas that are active. In this case, in some embodiments, the UE 20 can decide based on the scenario how many receive antennas to use for cell detection. For instance, once two strong cells have been detected, and the UE 20 repeatedly fails to detect more cells, it may at least occasionally use three receive antennas for cell detection, cancelling the interference from the two already found cells on that carrier. The reason to not always use all available antennas is the power penalties of having one more active receiver and the increased baseband processing. This is particularly the case for inter-frequency measurements and when in Discontinuous Reception (DRX). The UE's 20 decision of how many antennas to use for cell detection may further be influenced by or based on for instance:

Mobility: For instance, the UE 20 may search for weak cells more often when mobile than when stationary, particularly when in ultra-dense or small cell deployment areas, as e.g. deduced by the UE 20 based on history or as deduced from signaling from the cellular communications network 10. In high mobility the UE needs to find suitable handover candidates quicker, hence it may allow more power to be spent on cell search, e.g. by using more receive antennas to be able to cancel more directions or to get a higher antenna array gain.

Quality of serving cell(s): The UE 20 may spend more effort on searching for weak cells when the serving cell quality decreases (interference increases and/or signal strength decreases). Thus, in other words, the UE 20 may use more receive antennas for cell detection when the quality of the serving cell of the UE 20 decreases.

Signaling/configuration from the cellular communications network 10, including both explicit configuration and event-triggered UE 20 behavior.

Fulfilled conditions according to a rule in the applicable standard (e.g., 3GPP Evolved Universal Terrestrial Radio Access (EUTRA)).

Serving cell configuration and transmission mode (intra-frequency): If the UE 20 is using four receive branches in order to support the transmission mode, also using up to four receive branches for measurements (cell detection) is only a minor additional cost, whereas if only two receive branches are needed for the supported transmission mode it is a significant additional cost to receive on more receive branches just to improve mobility.

It should be noted that this is a complimentary method that may, in some embodiments, be used together with legacy methods. Concretely, one may want to also search for cells without interference rejection, at least periodically, since otherwise one may miss strong neighbor cells received from approximately the same perceived direction as the rejected cell.

Figure 5:
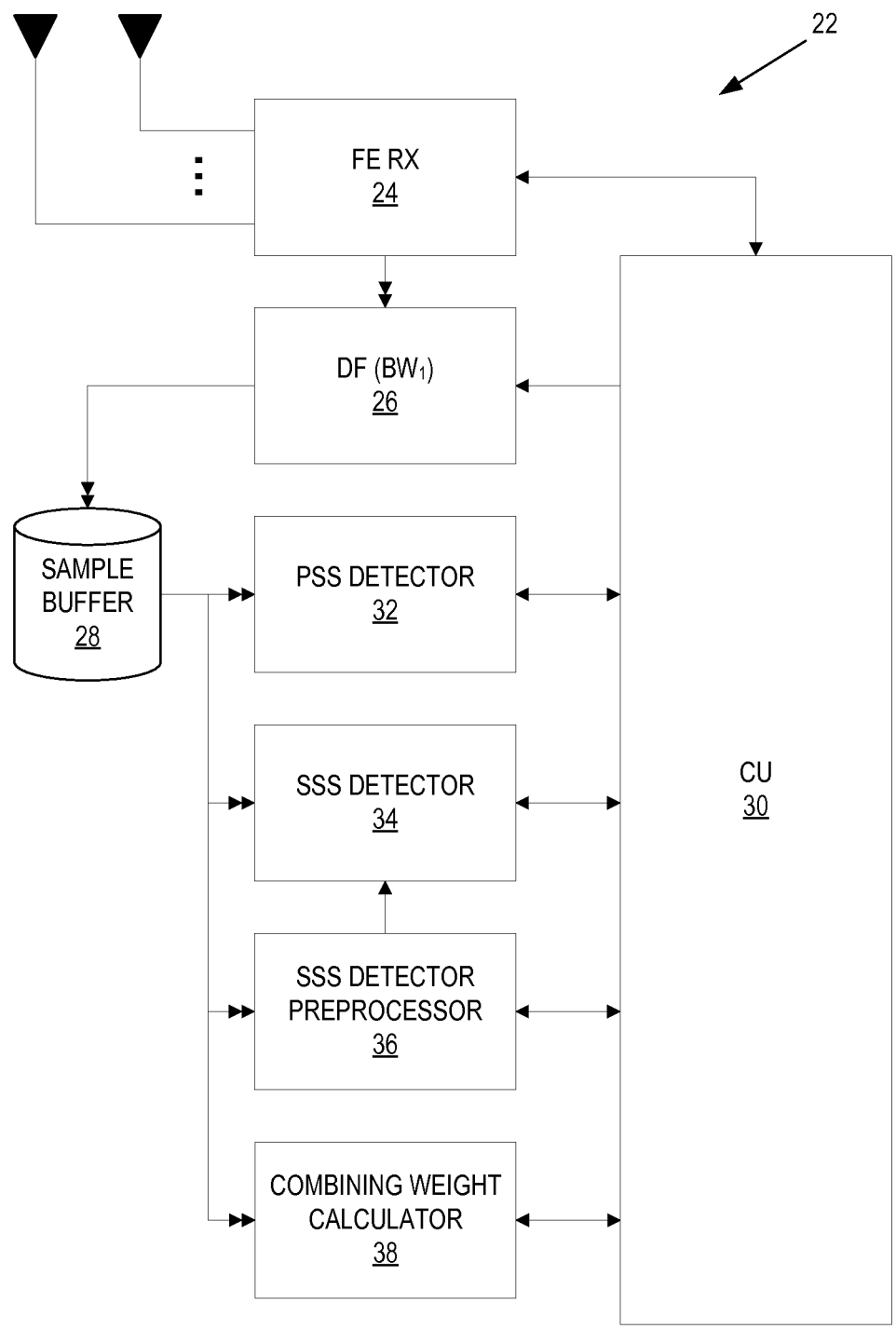
FIG. 5 illustrates a cell detection apparatus that can be embodied in the UE of FIG. 4 according to some embodiments of the present disclosure.

FIG. 5 illustrates a cell detection apparatus 22 that is implemented within the UE 20 or any other wireless device desiring to perform cell detection according to the embodiments described herein. As illustrated, the cell detection apparatus 22 includes two or more receive antennas connected to a radio Front-End Receiver (FE RX) 24 (e.g., the radio front-end of the UE 20). The received signals are passed through a Digital Filter (DF) 26, narrowing down the signal bandwidth and sampling rate to the bandwidth of interest for mobility measurements (usually equivalent with the smallest EUTRA system downlink bandwidth). The received samples are stored in a sample buffer 28, i.e. memory, for further processing. The operations of the radio front-end receiver 24 and the digital filter 26 are both controlled by a control unit 30.

The cell detection apparatus 22 further includes a PSS detection unit, or PSS detector, 32, typically realized in hardware, a SSS detection unit, or SSS detector, 34, typically realized in software (e.g., software executed by at least one processor such as, e.g., at least one Central Processing Unit (CPU), Application Specific Integrated Circuit (ASIC), or Field Programmable Gate Array (FPGA)), a SSS detector preprocessor 36, typically realized in software and a weight calculator unit, or combining weight calculator, 38, typically realized in software (e.g., software executed by at least one processor). All four units 32-38 are controlled by the control unit 30.

The control unit 30, which may be implemented in hardware or a combination of hardware and software, configures the radio front-end receiver 24 and the digital filter 26 to receive and store In-phase/Quadrature Phase (IQ) samples for mobility measurements and, in some embodiments, also decides how many of the receive antennas to use in the acquisition.

Figure 6:
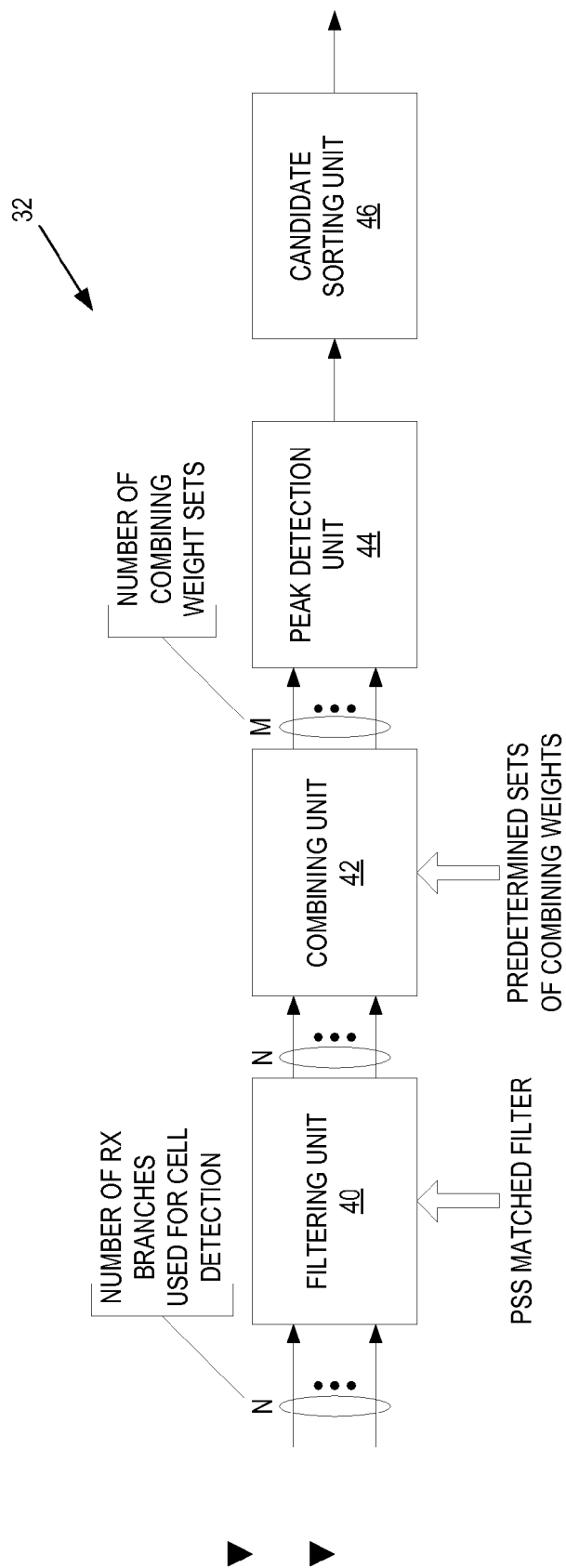
FIG. 6 is a more detailed illustration of the Primary Synchronization Signal (PSS) detection unit of FIG. 5 according to some embodiments of the present disclosure.

FIG. 6 illustrates the PSS detection unit 32 of FIG. 5 in more detail according to some embodiments of the present disclosure. As illustrated, the PSS detection unit 32 includes four parts: a filtering unit 40, a combining unit 42, a peak detection unit 44, and a candidate sorting unit 46.

The filtering unit 40 is configured with a time-domain filter that matches the PSS searched for. This time-domain filter is also referred to as a PSS-matched filter. The filtering unit 40 is further configured with a number (N) of data streams (from each of the N receive antennas that are active for PSS detection) to use as input. The filtering unit 40 carries out linear filtering, and may also derive other metrics and statistics such as residual energy (energy present in the input signal but not captured by the filter), which can be used for estimating SINR (see, for instance, commonly owned and assigned U.S. Pat. No. 7,983,197 entitled SYSTEM AND METHOD FOR ROBUST CELL DETECTION) or otherwise determining the quality of a detected signal.

The N filter outputs are passed on to the combining unit 42, further described below, which applies weights to each filter output and coherently accumulates the corresponding resulting values from all N filter outputs. The combining unit 42 may operate on the N filter outputs using one or more sets of weights, depending on whether all identified interferers can be suppressed simultaneously or not. For each out of M sets of weights, where M=1 in case all known interferers can be suppressed simultaneously, the combining unit 42 produces one output.

The peak detection unit 44 selects the output from the combining unit 42 with the best metrics (e.g., signal power, signal quality, or both), and passes on information related to the selected combiner output to the candidate sorting unit 46. The information includes an identifier for which of the M combiner outputs the selected metrics stems. In case of M>1 this information will be used in subsequent steps of the cell detection.

The candidate sorting unit 46 may be similar as in conventional PSS detection systems—see for instance U.S. Pat. No. 7,983,197 where an efficient peak metric sorting circuitry for retrieval of the top candidates is described. The sorting circuitry maintains a limited list of cell candidates with the best metrics (e.g., signal power, signal quality, or both). By discarding candidates with low momentary Signal to Noise Ratio (SNR), synchronization interference from uplink transmissions is avoided. Additional information added by this disclosure would be from which set of weights a detected cell candidate originates.

The combining and peak detection units 42 and 44 may additionally support conventional non-coherent accumulation of the N filter outputs to be used, e.g., when there is no need to suppress any interferer, and whether to operate in one mode or another may be configurable by the control unit 30. For conciseness this is omitted in the description and the figures, but it shall be understood that the embodiments disclosed herein can be combined with/extend conventional PSS detection.

Figure 7A:
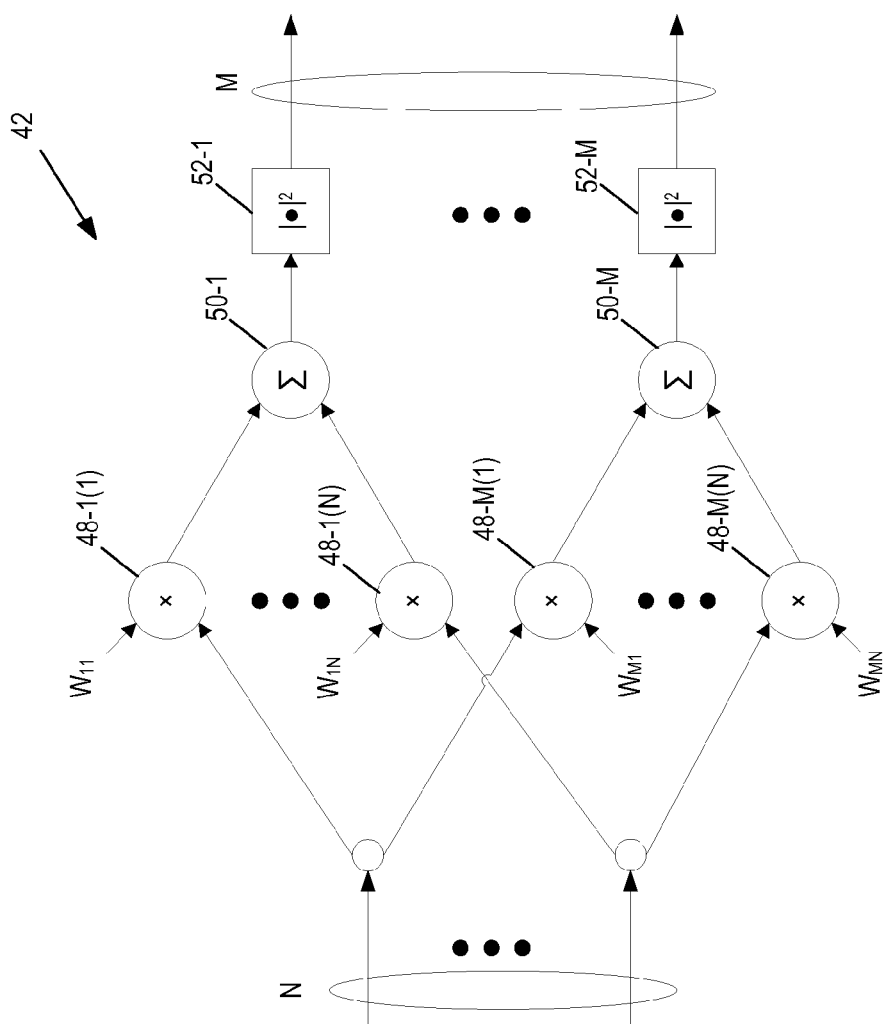
FIGS. 7A and 7B illustrate some exemplary embodiments of the combining unit of FIG. 6 according to some embodiments of the present disclosure.
Figure 7B:
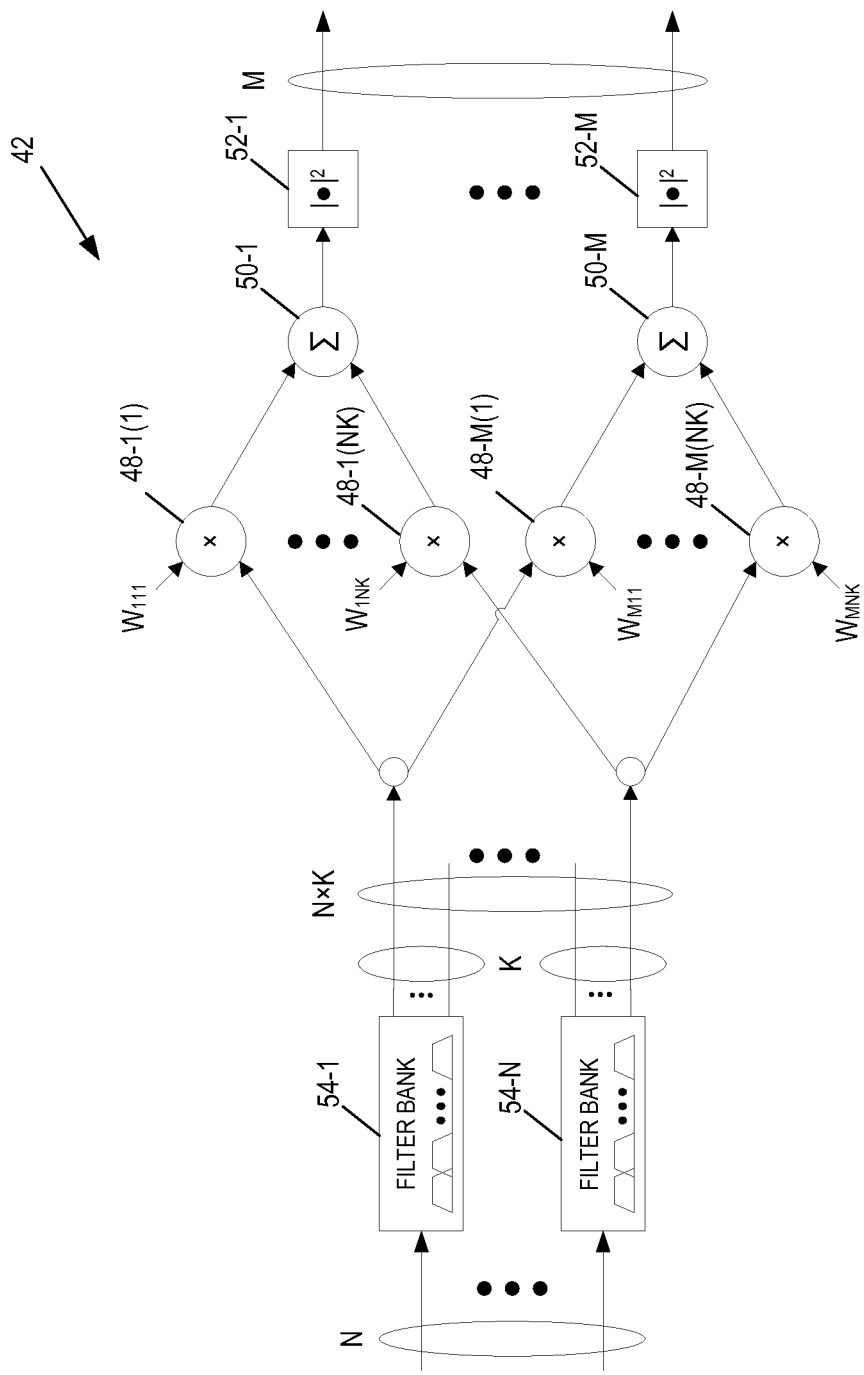

FIGS. 7A and 7B illustrate some example embodiments of the combining unit 42 taking N filtered values, each from one out of N active receive antennas, as input and producing M combined outputs, each suppressing up to N−1 directions. Hence there are M sets of N associated weights each. To exemplify: In case there are two active receive antennas (N=2) and only one source of interference is to be suppressed (M=1), the set of weights comprises W11 and W12.

The embodiment of the combining unit 42 in FIG. 7A can be used when, for each direction to be suppressed (i.e., for each m in m=1 . . . M), a single set of weights is used over the whole bandwidth occupied by synchronization signals (only 62 out of 72 central subcarriers carry synchronization information; the remaining 10 subcarriers are unused). The N×M weights are configured by the control unit 30 before operation. In particular, in some embodiments, the control unit 30 configures the combining weight calculator 36 to estimate combining weights. Once done, the control unit 30 configures the PSS detector 32 with those weights. However, the control unit 30 may alternatively delegate to the combining weight calculator 36 such that the combining weight calculator 36 configures the PSS detector 32 with the weights.

Specifically, as illustrated in FIG. 7A, a single weight per antenna is used for the whole bandwidth. The weights (indicated as $W_{11}$ through $W_{1N}$) for the first direction/cell to be blocked are applied to the N receive signals, respectively, to provide weighted receive signals for the first direction/cell (i.e., for direction m=1). Likewise, if the number of directions/cells to be blocked is greater than 1 (i.e., if M>1), then for each additional direction, the weights for those directions/cells to be blocked are also applied to the N receive signals respectively to provide weighted receive signals for those directions/cells. This is illustrated for the direction/cell m=M where the weights (indicated as $W_{M1}$ through $W_{MN}$) for the Mth direction/cell to be blocked are applied to the N receive signals respectively to provide weighted receive signals for the Mth direction/cell. In this example, the weights are applied to the receive signals by corresponding multipliers 48-1(1) through 48-1(N) for the first direction/cell, . . . , and multipliers 48-M(1) through 48-M(N) for the Mth direction/cell.

The weighted receive signals for the M directions/cells are combined by corresponding combiners 50-1 through 50-M. After combination, the data is magnitude-squared by elements 52-1 through 52-M (illustrated by $|\circ|^2$) before it is output by the combining unit 42 and passed on to the peak detection unit 44. The purpose of the magnitude-square operation is to allow comparison between the peak amplitudes without phase; hence, one may alternatively use, e.g., the magnitude or an approximation thereof. In the embodiment of the combining unit 42 of FIG. 7B, the bandwidth of interest is divided into K sub-bands and one weight per antenna per sub-band is used for combining. The embodiment of the combining unit 42 in FIG. 7B can be used when, for each direction to be suppressed (i.e., for each m in m=1 . . . M), two or more weights are to be used over the bandwidth occupied by synchronization signals (which is also referred to herein as the bandwidth of interest for PSS/SSS detection), to allow an even better suppression of the interferer. The bandwidth is split into K sub-bands, and one weight per antenna and sub-band is used. Thus, for each direction, the corresponding set of weights includes N×K weights, and the total number of weights is N×K×M. Each filter output is passed through a filter bank with K sub-bands. As one example, the bandwidth occupied by the synchronization signal is split into sub-bands of 32 subcarriers each (low-pass and high-pass), and one combining weight for each such sub-band and antenna is derived. The N×K×M weights are configured by the control unit 30 before operation.

Specifically, as illustrated in FIG. 7B, the N receive signals are filtered by filter banks 54-1 through 54-N to divide each receive signal into corresponding sub-band receive signals. Thus, the receive signal from the first antenna is filtered by the filter bank 54-1 to generate K sub-band receive signals. Each of these K sub-band receive signals is the component of the receive signal from the first antenna that falls within the corresponding sub-band. In the same manner, the other receive signals are filtered by the other filter banks 54-2 (not shown) through 54-N to provide corresponding sub-band receive signals. The weights (indicated as $W_{111}$ through $W_{1NK}$) for the N antennas for the K sub-bands for the first direction/cell to be blocked are applied to the N×K sub-band receive signals, respectively, to provide weighted sub-band receive signals for the first direction/cell (i.e., for direction m=1). Likewise, if the number of directions/cells to be blocked is greater than 1 (i.e., if M>1), then for each additional direction, the weights for the N antennas for the K sub-bands for those directions/cells to be blocked are also applied to the N×K sub-band receive signals respectively to provide weighted sub-band receive signals for those directions/cells. This is illustrated for the direction/cell m=M where the weights (indicated as $W_{M11}$ through $W_{MNK}$) for the N antennas for the K sub-bands for the Mth direction/cell to be blocked are applied to the N×K sub-band receive signals respectively to provide weighted sub-band receive signals for the Mth direction/cell. In this example, the weights are applied to the sub-band receive signals by corresponding multipliers 48-1(1) through 48-1(NK) for the first direction/cell and multipliers 48-M(1) through 48-M(NK) for the Mth direction/cell.

The weighted sub-band receive signals for the M directions/cells are combined by corresponding combiners 50-1 through 50-M. After combination, the data is magnitude-squared (in FIG. 7B illustrated by $|\circ|^2$) by elements 52-1 through 52-M before it is output by the combining unit 42 and passed on to the peak detection unit 44. The purpose of the magnitude-square operation is to allow comparison between the peak amplitudes without phase; hence, one may alternatively use, e.g., the magnitude or an approximation thereof.

Figure 8A:
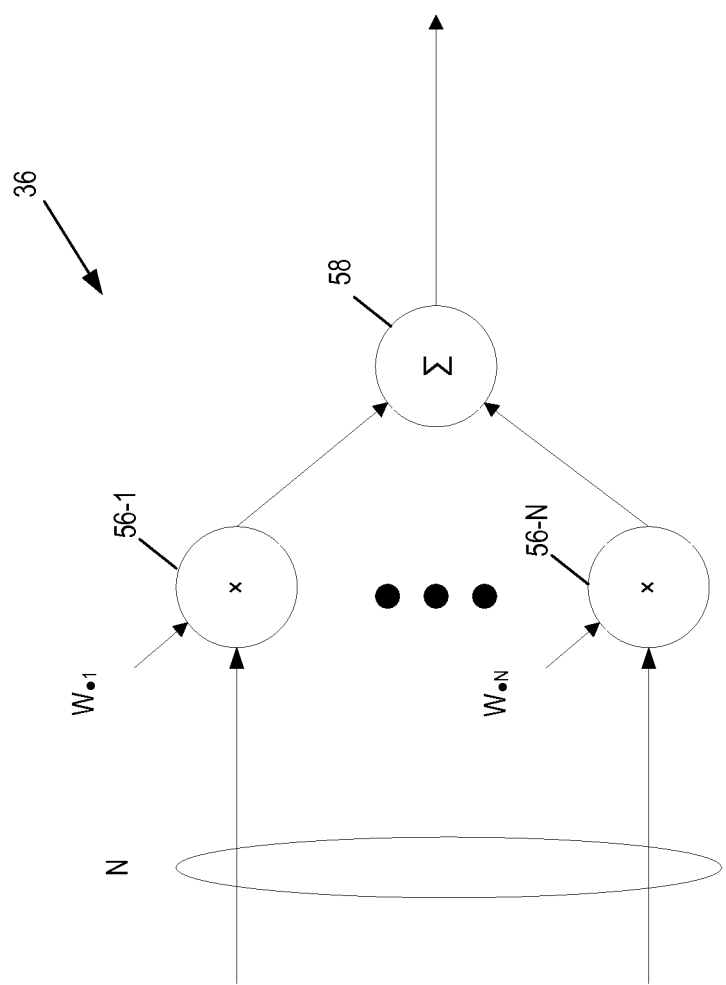
FIGS. 8A and 8B illustrate some exemplary embodiments of the Secondary Synchronization Signal (SSS) detector preprocessor unit of FIG. 5 according to some embodiments of the present disclosure.
Figure 8B:
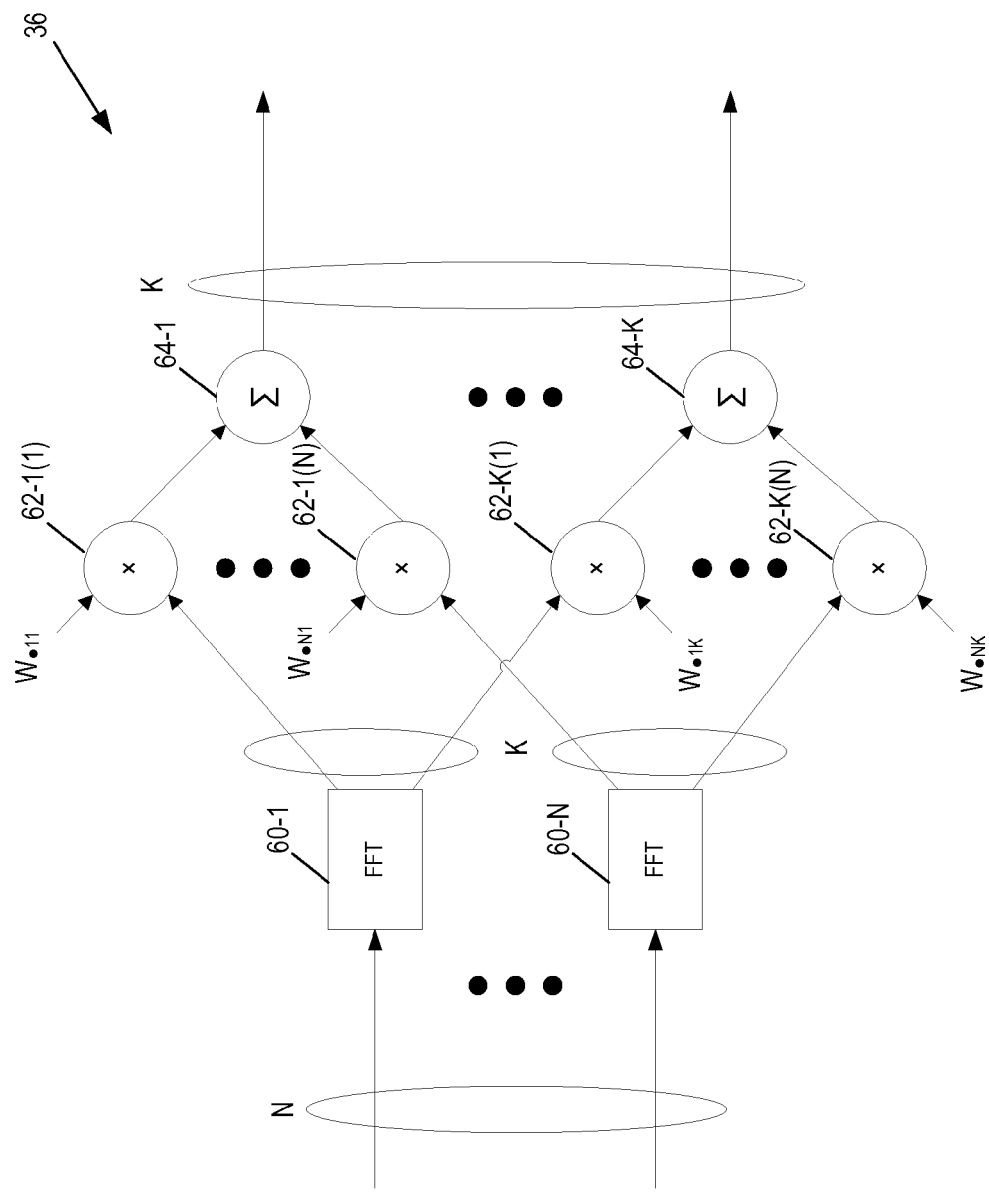

The SSS detection unit 34 in FIG. 5 is based on coherent or non-coherent SSS detection, but the signals recorded from the receive antennas are combined by the SSS detector preprocessor 36 using combining weights that have been derived to suppress transmissions from the already detected strong cell(s). Exemplary pre-processing of the IQ samples for SSS detection is illustrated in FIGS. 8A and 8B. As illustrated in FIG. 8A, a single weight per receive branch is applied in the time-domain. In particular, a set of weights $W_{\cdot 1}$ through $W_{\cdot N}$ are applied to the IQ samples from the N receive antennas (which are referred to as the N receive signals) by multipliers 56-1 through 56-N, respectively. The weighted samples are combined by a combiner 58 to provide the output of the SSS detector preprocessor 36. Similarly, in FIG. 8B, weights for the SSS detector preprocessor 36 are applied in the frequency domain. As illustrated, the IQ samples from the N receive antennas are first transformed to the frequency domain by K point Fast Fourier Transform (FFT) elements 60-1 through 60-N, respectively. K may be, in this case, 128, but is not limited thereto. Weights ($W_{\cdot 11}$ through $W_{\cdot N1}$, . . . , $W_{\cdot 1K}$ through $W_{\cdot NK}$) are applied to the N*K outputs of the N K point FFT elements 60-1 through 60-N by corresponding multipliers 62-1(1) through 62-K(N) to provide weighted outputs. The weighted outputs for each of the K sub-bands, or frequencies, are combined by corresponding combiners 64-1 through 64-K to provide K outputs of the SSS detector preprocessor 36 for K sub-bands.

The set of weights used by the SSS detector preprocessor 36 (e.g., of either FIG. 8A or 8B) may be the same as used in the PSS detection (same set as for which the peak was detected), or new weights to apply, e.g., in the frequency domain may be derived. The granularity may differ—e.g., if using a single weight for the whole bandwidth in the PSS detection (see FIG. 7A), one may use a finer granularity for the SSS detection, e.g., deriving one set of weights for each resource block (12 subcarriers; 180 kilohertz (kHz)).

The weight calculator unit 38 calculates channel estimates for strong already detected cells using known signals, for instance SSS, and determines weights that suppress transmissions from particular port(s) from those cells.

Denoting a resource element k received on the UE 20 side using N receiver antennas as a (N×1) vector:

$$y_k = \begin{bmatrix} y_{k,1} \\ y_{k,2} \\ \vdots \\ y_{k,N} \end{bmatrix}$$

and the information sent from cell q (known or unknown) (N×1) vector:

$$x_{q,k} = \begin{bmatrix} x_{q,k,1} \\ x_{q,k,2} \\ \vdots \\ x_{q,k,P(q)} \end{bmatrix}$$

where P(q) is the number of antenna ports used in that cell for this resource element, and the radio channel (N×P) matrix) seen by the UE 20 from each of the antenna ports of cell q is denoted:

$$H_{q,k} = \begin{bmatrix} h_{11} & h_{12} & \cdots & h_{1P(q)} \\ h_{21} & h_{22} & \cdots & h_{2P(q)} \\ \vdots & \vdots & \ddots & \vdots \\ h_{N1} & h_{N2} & \cdots & h_{NP(q)} \end{bmatrix}_{q,k}$$

the received resource element k can somewhat simplified be expressed as (N×1) vector as:

$$y_k = \sum_{q=1}^{L} H_{q,k} x_{q,k} + \sum_{q=L+1}^{Q} H_{q,k} x_{q,k} + v_k$$

where Q is the total number of received cells, L is the number of already detected cells, and $v_k$ is additive noise. Synchronization signals are transmitted from a single antenna port, hence for the concerned resource element (provided that it is aligned with the sampled Orthogonal Frequency Division Multiplexing (OFDM) symbol) there is only one signal sent from the base station or eNB and thus only one weight per receive antenna hence the radio channel for the synchronization signals can be described as the (N×1) matrix/vector $$H_{q,k}^{(sync)} = \begin{bmatrix} h_{11} \\ h_{21} \\ \vdots \\ h_{N1} \end{bmatrix}_{q,k}$$

It is desirable to suppress any transmission from one or more already detected cells as they might partially overlap with synchronization signals of yet undetected cells. Additionally, the synchronization signals are often transmitted from physical antennas used for other channels and transmission modes as well, hence some interference from other than synchronization signals will be suppressed too.

Provided that L<N, i.e. the cells to suppress are fewer than the number of receive branches used for cell detection, it is desirable to find a set of coefficients $\theta_k$ ((N×1) vector), upon which the spatial weights will be based, that fulfills $$\begin{cases} \theta_k^H \hat{H}_{1,k}^{(sync)} = 0 \\ \theta_k^H \hat{H}_{2,k}^{(sync)} = 0 \\ \quad \vdots \\ \theta_k^H \hat{H}_{L,k}^{(sync)} = 0 \\ \theta_k^H \theta_k = 1 \end{cases},$$

i.e., a set of coefficients that annihilates the signal components that have been subjected to particular radio channels, as captured by the channel estimates $\hat{H}_{q,k}^{(sync)}$(N×1 vector), q=1 . . . L.

Arranging the channel estimates into a (N×L) matrix $C_k = [\hat{H}_{1,k}^{(sync)} \hat{H}_{2,k}^{(sync)} \ldots \hat{H}_{L,k}^{(sync)}]$ one can form the quadratic form $\theta_k^H C_k C_k^H \theta_k = 0$. Since L<N it means that the vector $\theta_k$ is in the null space of $C_k C_k^H$ ((N×N) matrix) and can be found, e.g., via eigenvalue decomposition. In case of N=L+1 there is only one vector in the null space hence it is uniquely determined, but in case N>L+1 there will several vectors that can be used as coefficients, either alone or in linear combination.

When having different weights for different sub-bands (groups of subcarriers), care needs to be taken not to have the desirable signal components on different subcarriers to be adding up destructively in the coherent summation in FIG. 7B, i.e., to introduce abrupt phase shifts between the $\theta_k$ and $\theta_{k+1}$ for "directions" other than the suppressed ones. Alternatively, one may for instance carry out a coherent summation for each sub-band followed by magnitude-square, and then carry out summation over the latter.

For the case of a single weight per receive antenna for the whole bandwidth (FIG. 7A) one may for instance form a (N×L) matrix:

$$C = [\overline{H}_1^{(sync)} \overline{H}_2^{(sync)} \ldots \overline{H}_L^{(sync)}]$$

where $$\hat{\overline{H}}_l^{(sync)} = \frac{1}{62} \sum_{k=1}^{62} \hat{H}_{l,k}^{(sync)},$$

and search for a vector $\theta$ for which $\theta^H C C^H \theta = 0$ under the constraint $\theta^H \theta = 1$. Assuming a single set of weights (M=1), one cell to block (L=1) and two receive branches (N=2), the weights $$\begin{cases} w_{11} = \theta_1^* \\ w_{12} = \theta_2^* \end{cases}$$

can be used to suppress the direction from which PSS and SSS are sent out in the detected cell.

Alternatively, one can determine the weights by forming $$C = [\hat{H}_{1,1}^{(sync)} \hat{H}_{1,2}^{(sync)} \ldots \hat{H}_{1,62}^{(sync)}],$$

and then search for the subspace associated with the smallest eigenvalue since $CC^H$ is not rank deficient by design, and hence it cannot be guaranteed that there exists a null space. The difference between the approaches is mainly that in the latter alternative the average channel weights are implicitly derived in a least squares manner.

It shall be noted that these are only a few out of a multitude of alternatives for determining the weights. The objective, however, is the same: to suppress signal components from one or more already detected cell(s), simultaneously or sequentially.

Figure 9:
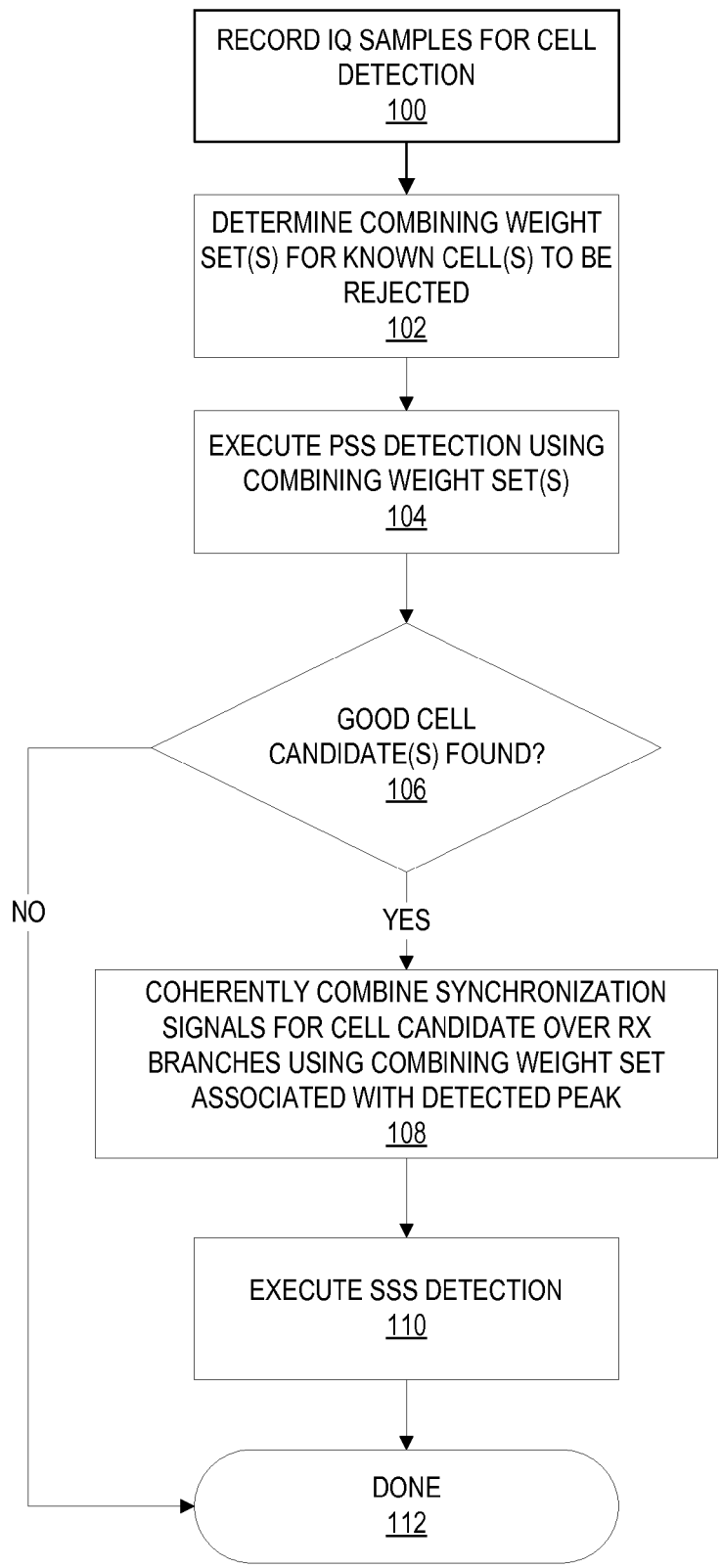
FIG. 9 is a flow chart that illustrates a cell detection process according to some embodiments of the present disclosure.

FIG. 9 is a flow chart that illustrates a cell detection process according to some embodiments of the present disclosure. As illustrated, IQ samples are acquired for an appropriate amount of time (e.g., 5-6 milliseconds (ms)) and stored in memory (step 100). Notably, by storing, or buffering, the IQ samples, the IQ samples can be spatially filtered for cell detection without impacting the ability to using non-spatially filtered IQ samples for normal signal processing (e.g., the reception of desired signal(s) from the serving cell(s)).

The SSS of the cell(s) to be rejected are localized in the recorded data and used for estimation of the radio channels of the cell(s) to be rejected. The channel estimates are used for forming one or more sets of combining weights (as discussed above) which, when applied to the received signals, suppress transmissions from the cell(s) to be rejected (step 102). In other words, the set(s) of combining weights for spatially filtering (also referred to herein as suppressing, rejecting, or blocking) transmissions from a perceived direction(s) of a previously detected strong cell(s) are determined. As discussed above, the set(s) of combining weights are determined based on the estimated radio propagation channels for the previously detected strong cell(s) based on known or predetermined transmissions (e.g., SSS transmissions) from those cells.

PSS detection is carried out, where IQ samples from the receive branches are filtered using filters matching PSS, weighted and accumulated coherently before taking the magnitude-square of the combined filter outputs, as discussed above. Peaks, indicative of cell candidates, are detected (step 104). In other words, PSS detection is executed using the set(s) of combining weights determined in step 102. As discussed above, during PSS detection, the IQ samples from the N receive antennas are combined according to the set(s) of combining weights determined in step 102 such that transmissions from the perceived directions of the previously detected strong cell(s) are spatially filtered. PSS detection is then performed based on the resulting combined signal(s).

In case good cell candidates have been found in the PSS detection, as can be determined from conventional metrics (step 106; YES), the OFDM symbols corresponding to synchronization signals of the cell candidate are localized and combined using the set of combining weights associated with the detected peak (when M>1) (step 108). The weights may be identical to the weights used in the PSS detection (e.g., a single weight for the whole bandwidth), or a new set of weights with finer granularity (per sub-band or even subcarrier) may be derived. SSS detection is carried out using the combined signals (step 110). Thereafter the procedure is finished for this measurement occasion (step 112). In case a good cell was not found (step 106; NO), the cell detection is terminated (step 112) without attempting to detect a SSS.

As discussed above, embodiments are disclosed in which an interference rejection approach is used to suppress synchronization signals from known strong cells when searching for, e.g., weaker cells, in order to improve the SINR and thereby the detectability of weak cells whose signals impinge on the UE receive antenna array with different relation between phase and amplitude than for the already detected cell.

In a field test in an indoor office building, one strong cell was always detected and some weak cells were detected only occasionally when using the prior or legacy approach. When using the methods as described herein, the detection probability, as well as the SSS SINR, increases (improves) significantly.

One example line-of-sight cell was detected only in about 5% of the cell detection attempts when using the legacy method. When using the embodiments herein, this cell was detected in close to 70% of the attempts. The SSS SINR was improving from −11 to −4 dB.

While not being limited to or by any particular benefit or advantage, the solution(s) provided by at least some of the embodiments disclosed herein allows suppression or spatial filtering or blocking of transmission from one or more already detected cells to be carried out, thereby improving the SINR for signals arriving from other directions than the suppressed or blocked one(s) and hence allowing, e.g., neighbor cells in small cell deployment or ultra-dense deployment to be detected earlier, giving more time to appropriately carry out a handover.

The embodiments disclosed herein can be implemented with insignificant impact on the UE complexity compared to that of 3GPP LTE Release 8-9 legacy terminals.

Compared to interference cancellation based on subtraction of synchronization signals from known cell(s), embodiments disclosed herein can additionally suppress other signals sent from the same (set of) physical antenna(s) as long as the propagation channel does not change significantly over the time frame (e.g., 5 ms) used for each cell detection attempt.

Embodiments disclosed herein can, as an extension to already existing cell detection functionality, pave the way for tighter UE requirements on cell detection at lower SINR thereby facilitating a proper mobility function and handover operation also in future deployment scenarios.

Figure 10:
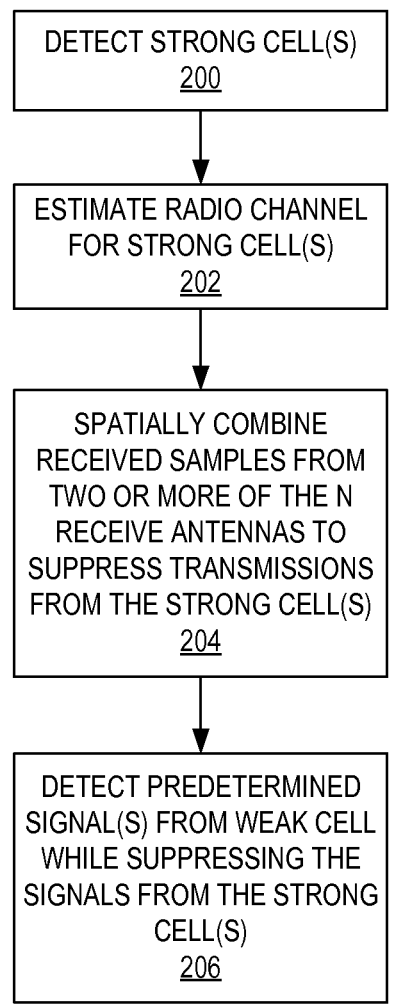
FIG. 10 is a flow chart that illustrates a predetermined signal detection process according to some embodiments of the present disclosure.

It should be noted that the discussion above focuses on the suppressions of interfering signals during detection of PSS and/or SSS. However, concepts disclosed herein are not limited thereto. In particular, the concepts disclosed herein can be used to suppress interference during detection of any predetermined signal known to the wireless device, or UE. In this regard, FIG. 10 illustrates a process for detecting a predetermined signal according to some embodiments of the present disclosure. This process is performed by the wireless device, or UE 20. As illustrated, the UE 20 detects one or more strong cells (step 200). The one or more strong cells may include a serving cell of the UE 20 and/or one or more strong, or dominant, interfering cells. The UE 20 estimates the radio channel for each strong cell(s) (step 202). As discussed above, the channel estimate(s) of the strong cell(s) are used to compute or otherwise generate one or more sets of combining weights (as discussed above) which, when applied to the received signals, suppress transmissions from the strong cell(s).

When detection of a predetermined signal is desired, the UE 20 spatially combines received signals from two or more of the N receive antennas of the UE 20 (using the combining weights) to thereby suppress transmissions from the strong cell(s) (step 204). This spatial combining may be performed as described above. While suppressing the transmissions from the strong cell(s), the UE 20 detects the predetermined signal(s) from a weak cell(s) using any appropriate detection technique for the predetermined signal(s) (step 206).

Figure 11:
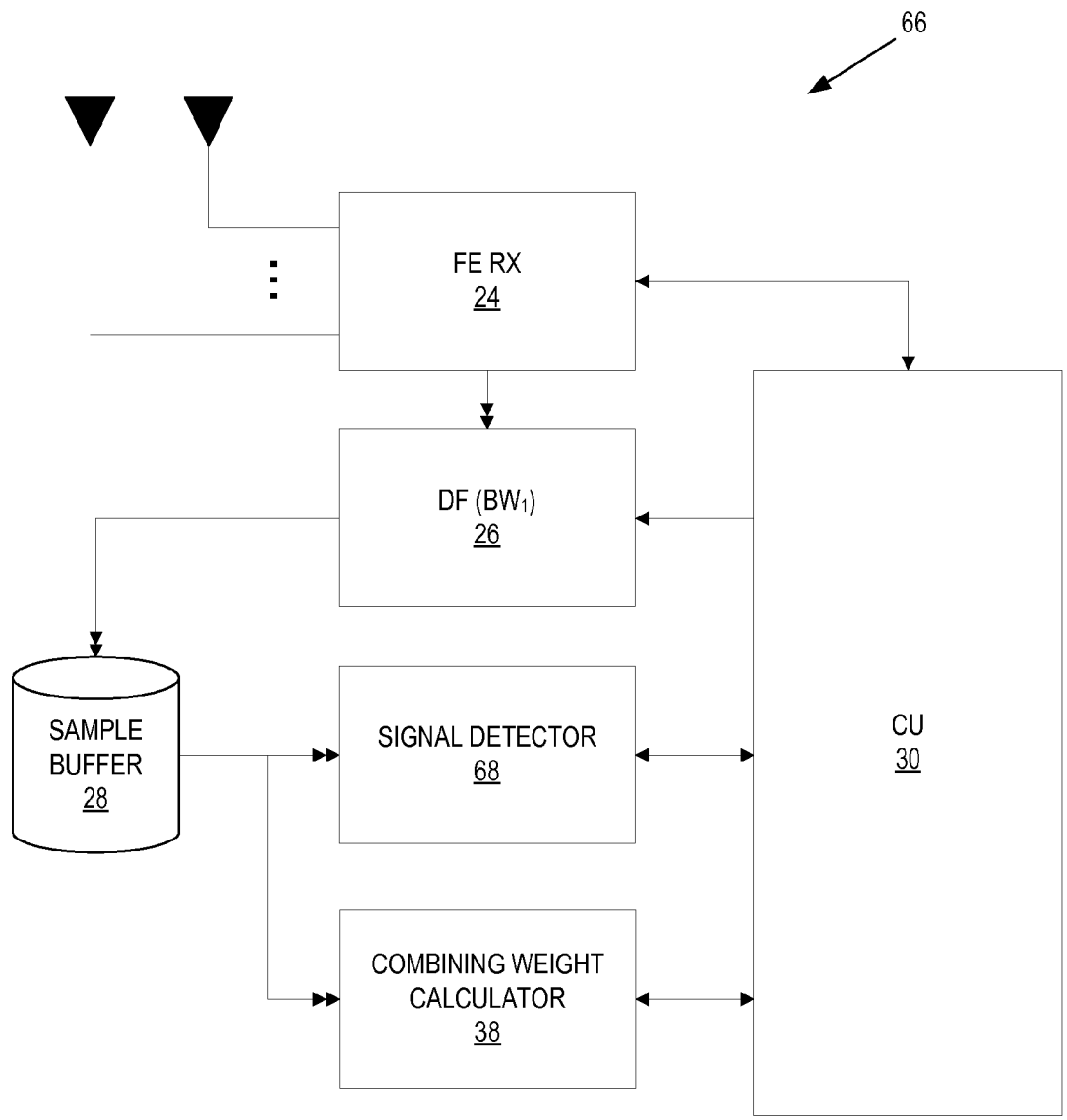
FIG. 11 illustrates a predetermined signal detection apparatus according to some embodiments of the present disclosure.

FIG. 11 is a block diagram of a predetermined signal detection apparatus 66 according to some embodiments of the present disclosure. The predetermined signal detection apparatus 66 is implemented within a UE 20 or any other wireless device desiring to detect the predetermined signal according to the embodiments described herein. The predetermined signal detection apparatus 66 includes some components in common with those of the cell detection apparatus 22 and, as such, the same reference numerals are used. As illustrated, the predetermined signal detection apparatus 66 includes two or more receive antennas connected to a radio front-end receiver 24 (e.g., the radio front-end receiver of the UE 20). In some embodiments, the received signals are passed through a digital filter 26, narrowing down the signal bandwidth and sampling rate to the bandwidth of interest for detection of the predetermined signal. The received samples are stored in a sample buffer 28, i.e. memory, for further processing. The operations of the radio front-end receiver 24 and the digital filter 26 are both controlled by a control unit 30.

The predetermined signal detection apparatus 66 further includes a detection unit, or signal detector, 68, typically realized in hardware and a weight calculator unit, or combining weight calculator 38, typically realized in software (e.g., software executed by at least one processor). The units 68 and 38 are controlled by the control unit 30. The detection unit 68 and the weight calculator unit 38 operate similar to the corresponding units of the cell detection apparatus 22 of FIG. 5.

The control unit 30, which may be implemented in hardware or a combination of hardware and software, configures the radio front-end receiver 24 and the digital filter 26 to receive and store samples for detection of the predetermined signal and, in some embodiments, also decides how many of the receive antennas to use in the acquisition.

Figure 12:
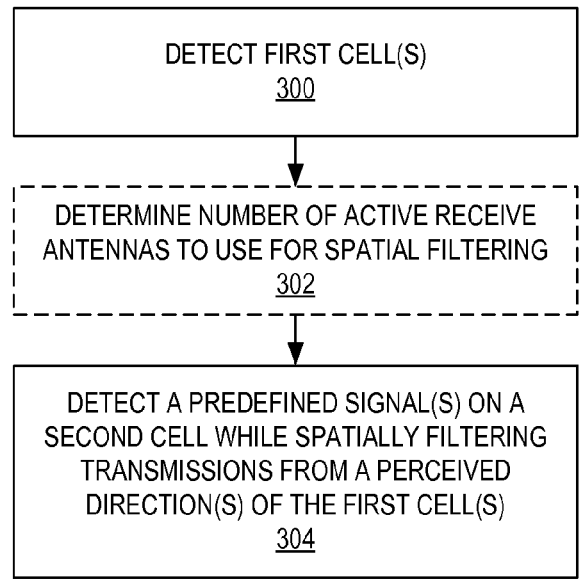
FIG. 12 is a flow chart that illustrates a process for detecting a predefined, or predetermined, signal(s) while spatially filtering transmissions from a perceived direction(s) of a previously detected cell(s) according to some embodiments of the present disclosure.

FIG. 12 is a flow chart that illustrates a signal detection process according to embodiments disclosed herein. As described above, one or more first cells are detected (step 300). The one or more first cells are strong cells that will cause interference when attempting to detect a predetermined signal from a second weaker cell. The first cell(s) may include a serving cell(s) of the UE 20 and/or a non-serving cell(s) of the UE 20. Optionally, in some embodiments, a number of active receive antennas to use for spatially filtering is determined (step 302). This determination may be made based on any suitable criteria, as discussed above. The number of active receive antennas to be used may be determined to be all receive antennas or less than all receive antennas.

One or more predefined signals on a second cell are detected while spatially filtering transmissions from a perceived direction(s) of the first cell(s), as discussed above (step 304). The second cell is a weak cell (e.g., a neighbor cell). In some embodiments, the one or more predefined signals from the second cell include a synchronization signal, a discovery signal, a reservation signal, and/or a reference signal.

Figure 13:
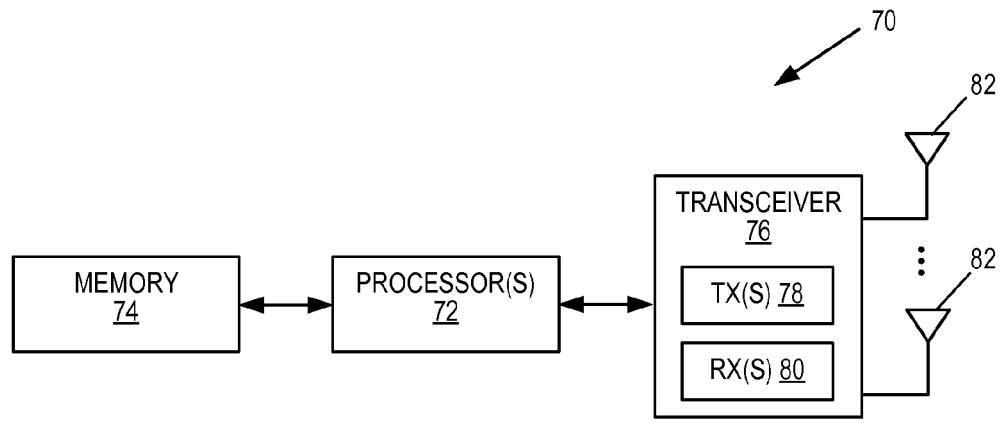
FIG. 13 is a block diagram of a UE according to some embodiments of the present disclosure.

FIG. 13 illustrates a UE 70 according to some embodiments of the present disclosure. The UE 70 implements or incorporates the cell/predetermined signal detection apparatus 22, 66 described above. As illustrated, the UE 70 includes one or more processors or processor circuits 72 (e.g., CPU(s), ASIC(s), FPGA(s)), memory 74, and a transceiver 76 including one or more transmitters 78 and one or more receivers 80 connected to a number of antennas 82. As discussed above, in some embodiments, at least some components of the cell/predetermined signal detection apparatus 22, 66 of FIG. 5 or FIG. 11, respectively, are implemented in software. This software may be stored in the memory 74 and executed by the processor(s) 72, whereby the UE 70 operates to provide the corresponding functionality. As also discussed above, in some embodiments, at least some of the components of the cell/predetermined signal detection apparatus 22, 66 of FIG. 5 or FIG. 11, respectively, are implemented in hardware. This hardware may be included within the processor(s) 72 (e.g., hardware signal processor) or may be external to the processor(s) 72 (not shown).

In some embodiments, a computer program including instructions which, when executed by at least one processor, causes the at least one processor to carry out the functionality of the cell detection apparatus according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 74).

The present disclosure relates to systems and methods for improving cell detection via interference rejection. Embodiments of a method of operation of a wireless device in a cellular communications network are disclosed. In some embodiments, the method of operation of the wireless device includes performing detection of a predetermined signal known to the wireless device (e.g., via signaling or from a standard(s)) while suppressing or blocking, or spatially filtering, one or more interfering transmissions from one or more previously detected cells. In some embodiments, the predetermined signal known to the wireless device is a synchronization signal (e.g., PSS detection or SSS), a discovery signal (e.g., a discovery signal used for License-Assisted Access (LAA)), a reservation signal (e.g., a reservation signal used for LAA), or a reference signal. The one or more previously detected cells may include, for example, a serving cell of the wireless device. In addition, the one or more previously detected cells may include one or more strong (e.g., dominant) interfering cells. Further, in some embodiments, the one or more interfering signals comprise one or more synchronization signals transmitted by the one or more previously detected cells.

In some embodiments, the wireless device comprises a number (N) of receive antennas, where N is greater than or equal to 2, and performing detection of the predetermined signal known to the wireless device is based on weighting and combining signals received on the N receive antennas of the wireless device in such a manner that the interfering transmissions from the one or more previously detected cells destructively combine (i.e., are rejected). In other words, performing detection of the predetermined signal is based on weighting and combining signals received on the N receive antennas of the wireless device in such a manner that transmissions impinging the N receive antennas from one or more perceived directions are blocked (i.e., transmissions impinging on the receive antennas from the perceived direction(s) is(are) spatially filtered). Notably, a perceived direction should be understood as being decoupled from geographic coordinates. A transmission impinges on the N receive antennas from a particular perceived direction if the same transmission received on two or more of the N receive antennas has a given phase difference. This phase difference corresponds to the perceived direction from which the transmissions impinges the N receive antennas. The perceived directions that are blocked are perceived directions corresponding to the one or more previously detected cells.

In some embodiments, the interfering transmissions that are blocked or spatially filtered for detection of the predetermined signal are blocked only for detection of the predetermined signal and not for other receptions (e.g., data reception). For example, for PSS and/or SSS, interfering transmissions from the one or more previously detected cells are blocked for detection of PSS and/or SSS but the transmissions from the one or more previously detected cells are not blocked for other receptions (e.g., data reception).

In some embodiments, the number of directions to be suppressed or blocked is less than or equal to N−1, and a single set of interference rejection combining weights is utilized when performing detection of the predetermined signal. In other embodiments, the number of directions to be suppressed or blocked is greater than N−1, and multiple sets of interference rejection combining weights are utilized when performing detection of the predetermined signal, where each set of weights blocks one or more of the directions to be blocked. When using the multiple sets of weights, detection of the predetermined signal may be performed using the different sets of weights in parallel or sequentially.

In some embodiments, the predetermined signal has a predefined bandwidth, and performing detection of the predetermined signal utilizes the same interference rejection combining weight(s) across the entire predefined bandwidth. In other embodiments, the predefined bandwidth is divided into multiple sub-bands, and performing detection of the predetermined signal utilizes different interference rejection combining weight(s) for each sub-band.

In some embodiments, the predetermined signal is a synchronization signal, and the one or more interfering transmissions include a synchronization signal of a serving cell of the wireless device such that the synchronization signal of the serving cell is blocked while performing synchronization signal detection. In this manner, detection of synchronization signals from other cells is improved. This improvement may be particularly beneficial in scenarios where the wireless device is moving at a high speed (e.g., in a high speed train) or in scenarios where the wireless device is in a small cell environment (e.g., a shopping mall with many small cells).

In some embodiments, the wireless device includes multiple receive antennas, and the method of operation of the wireless device further comprises determining the number (N) of the receive antennas to use when performing detection of the predetermined signal (i.e., determining how many of the receive antennas to use when performing detection of the predetermined signal). The number (N) of the receive antennas to utilize when performing detection of the predefined signal may be all of the receive antennas or less than all (a subset) of the receive antennas. Determining the number of receive antennas to utilize when performing detection of the predefined signal may be based on one or more criteria including, for example, the number of directions to be spatially filtered, UE mobility (e.g., velocity relative cell size), quality of serving cell(s), signaling/configuration from the cellular communications network, conditions defined by, e.g., an applicable standard, and/or serving cell configuration and transmission mode.

Embodiments of a wireless device that operates according to any of the embodiments described herein are also disclosed.

The following acronyms are used throughout this disclosure.

3GPP 3$^{rd}$ Generation Partnership Project
4G 4$^{th}$ Generation
5G 5$^{th}$ Generation
ASIC Application Specific Integrated Circuit
CPU Central Processing Unit
dB Decibel
DF Digital Filter
DRX Discontinuous Reception
eICIC Enhanced Inter-Cell Interference Coordination
eNB Enhanced or Evolved Node B
EUTRA Evolved Universal Terrestrial Radio Access
EUTRAN Evolved Universal Terrestrial Radio Access Network
FDD Frequency Division Duplex
FE RX Front-End Receiver
feICIC Further Enhanced Inter-Cell Interference Coordination
FFT Fast Fourier Transform
FPGA Field Programmable Gate Array
HetNet Heterogeneous Network
ID Identity
IQ In-phase/Quadrature Phase
kHz Kilohertz
LAA License-Assisted Access, a.k.a. Unlicensed Spectrum
LTE Long Term Evolution
MBSFN Multi-Broadcast Single Frequency Network
MHz Megahertz
MIB Master Information Block
ms Millisecond
OFDM Orthogonal Frequency Division Multiplexing
PBCH Physical Broadcast Channel
PCell Primary Cell
PSCell Primary Secondary Cell
PSS Primary Synchronization Signal
RAN Radio Access Network
RB Resource Block
RS Reference Signal
RSRP Reference Signal Received Power
RSRQ Reference Signal Received Quality
SCell Secondary Cell
SINR Signal to Interference and Noise Ratio
SNR Signal to Noise Ratio
SSS Secondary Synchronization Signal
TS Technical Specification
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a wireless network to detect a predetermined signal in the presence of interference, comprising:
   detecting one or more first cells; and
   detecting one or more predetermined signals from a second cell while spatially filtering transmissions from one or more perceived directions of the one or more first cells, respectively, by using a set of combining weights comprising different weights for different sub-bands of a frequency band in which the transmissions from the one or more perceived directions of the one or more first cells are to be spatially filtered.

2. The method of claim 1 wherein the one or more predetermined signals from the second cell comprise at least one of a group consisting of: a synchronization signal, a discovery signal, a reservation signal, and a reference signal.

3. The method of claim 1 wherein the one or more first cells comprise one or more serving cells of the wireless device.

4. The method of claim 1 wherein the one or more first cells comprise one or more non-serving cells of the wireless device.

5. The method of claim 1 wherein detecting the one or more predetermined signals from the second cell while spatially filtering the transmissions from the one or more perceived directions of the one or more first cells, respectively, comprises detecting the one or more predetermined signals from the second cell while spatially filtering transmissions of one or more interfering signals by the one or more first cells but not spatially filtering transmissions of one or more desired signals by the second cell.

6. The method of claim 1 wherein detecting the one or more predetermined signals from the second cell while spatially filtering the transmissions from the one or more perceived directions of the one or more first cells, respectively, comprises:
 determining the set of combining weights for spatially filtering the transmissions from the one or more perceived directions of the one or more first cells; and
 combining samples received via two or more active receive antennas of the wireless device according to the set of combining weights to thereby spatially filter the transmissions from the one or more perceived directions of the one or more first cells.

7. The method of claim 6 wherein:
 the two or more active receive antennas is a number, N, of active receive antennas where $N \geq 2$; and
 the one or more first cells is a number, L, of first cells where $1 \leq L \leq N-1$.

8. The method of claim 7 wherein the set of combining weights comprises, for each active receive antenna of the two or more active receive antennas, a single weight for a full frequency band in which the transmissions from the one or more perceived directions of the one or more first cells are to be spatially filtered.

9. The method of claim 6 wherein:
 the two or more active receive antennas is a number, N, of active receive antennas where $N \geq 2$;
 the one or more first cells is a plurality, L, of first cells where $L > N-1$; and
 the set of combining weights for spatially filtering the transmissions from the one or more perceived directions of the one or more first cells is two or more sets of combining weights.

10. The method of claim 9 wherein combining the samples received via the two or more active receive antennas of the wireless device comprises:
 combining the samples received via the two or more active receive antennas according to a first set of combining weights from the two or more sets of combining weights to provide a first combined sample in which transmissions from one or more perceived directions of a first subset of the plurality of first cells are spatially filtered; and
 combining the samples received via the two or more active receive antennas according to a second set of combining weights from the two or more sets of combining weights to provide a second combined sample in which transmissions from one or more perceived directions of a second subset of the plurality of first cells are spatially filtered.

11. The method of claim 1 wherein the one or more predetermined signals comprises a primary synchronization signal of the second cell, and detecting the one or more predetermined signals from the second cell while spatially filtering the transmissions from the one or more perceived directions of the one or more first cells comprises:
 determining the set of combining weights for spatially filtering the transmissions from the one or more perceived directions of the one or more first cells; and
 performing a process for detecting the primary synchronization signal while spatially filtering the transmissions from the one or more perceived directions of the one or more first cells using the set of combining weights.

12. The method of claim 11 wherein the one or more predetermined signals further comprise a secondary synchronization signal of the second cell, and detecting the one or more predetermined signals from the second cell while spatially filtering the transmissions from the one or more perceived directions of the one or more first cells comprises:
 performing a process for detecting the secondary synchronization signal while spatially filtering the transmissions from the one or more perceived directions of the one or more first cells using the set of combining weights that corresponds to a detected peak for the primary synchronization signal when performing the process for detecting the primary synchronization signal.

13. The method of claim 1 wherein detecting the one or more predetermined signals from the second cell while spatially filtering the transmissions from the one or more perceived directions of the one or more first cells comprises:
 estimating a radio channel for the one or more first cells;
 spatially combining received samples from two or more active receive antennas based on the radio channel such that the transmissions from the one or more perceived directions of the one or more first cells are spatially filtered; and
 detecting the one or more predetermined signals from the second cell based on the spatially combined received samples.

14. The method of claim 1 further comprising determining a number of active receive antennas for use when detecting the one or more predetermined signals from the second cell while spatially filtering the transmissions from the one or more perceived directions of the one or more first cells, respectively.

15. The method of claim 14 wherein the number of active receive antennas to use is less than all receive antennas of the wireless device.

16. The method of claim 14 wherein determining the number of active receive antennas for use when detecting the one or more predetermined signals from the second cell while spatially filtering the transmissions from the one or more perceived directions of the one or more first cells, respectively, comprises:
 determining the number of active receive antennas to use based on one or more criteria selected from a group consisting of: a number of one or more perceived directions to be spatially filtered, a mobility of the wireless device, a quality of the one or more first cells, signaling from the wireless network, configuration by the wireless network, one or more predefined conditions, serving cell configuration, and transmission mode.

17. A wireless device operative to detect a predetermined signal in the presence of interference, comprising:

one or more receivers coupled to a plurality of receive antennas;
one or more processors; and
memory containing software executable by the one or more processors whereby the wireless device is operative to:
  detect one or more first cells; and
  detect one or more predetermined signals from a second cell while spatially filtering transmissions from one or more perceived directions of the one or more first cells, respectively, by using a set of combining weights comprising different weights for different sub-bands of a frequency band in which transmissions from the one or more perceived directions of the one or more first cells are to be spatially filtered.

18. The wireless device of claim 17 wherein the one or more predetermined signals from the second cell comprise at least one of a group consisting of: a synchronization signal, a discovery signal, a reservation signal, and a reference signal.

19. The wireless device of claim 17 wherein the one or more first cells comprise one or more serving cells of the wireless device.

20. The wireless device of claim 17 wherein the one or more first cells comprise one or more non-serving cells of the wireless device.

21. The wireless device of claim 17 wherein, in order to detect the one or more predetermined signals from the second cell while spatially filtering the transmissions from the one or more perceived directions of the one or more first cells, respectively, the one or more processors are further operative to:
  detect the one or more predetermined signals from the second cell while spatially filtering transmissions of one or more interfering signals by the one or more first cells but not spatially filtering transmissions of one or more desired signals by the second cell.

22. The wireless device of claim 17 wherein, in order to detect the one or more predetermined signals from the second cell while spatially filtering the transmissions from the one or more perceived directions of the one or more first cells, respectively, the one or more processors are further operative to combine samples received via two or more active receive antennas of the wireless device according to the set of combining weights to thereby spatially filter the transmissions from the one or more perceived directions of the one or more first cells.

23. A wireless device operative to detect a predetermined signal in a wireless network in the presence of interference, comprising:
  a front-end receiver coupled to a plurality of receive antennas;
  a filter configured to filter samples received from the plurality of receive antennas;
  a combining weight calculator operative to calculate a set of combining weights for spatially filtering transmissions from one or more perceived directions of one or more first cells; and
  a signal detector operative to detect a predetermined signal from a second cell while spatially filtering transmissions from the one or more perceived directions of the one or more first cells using the set of combining weights, wherein the set of combining weights comprises different weights for different sub-bands of a frequency band in which the transmissions from the one or more perceived directions of the one or more first cells are to be spatially filtered.

24. The wireless device of claim 23 wherein the predetermined signal from the second cell comprises at least one of a group consisting of: a synchronization signal, a discovery signal, a reservation signal, and a reference signal.

25. The wireless device of claim 23 wherein the one or more first cells comprise one or more serving cells of the wireless device.

26. The wireless device of claim 23 wherein the one or more first cells comprise one or more non-serving cells of the wireless device.

27. The wireless device of claim 23 wherein the predetermined signal from the second cell is detected while spatially filtering transmissions of one or more interfering signals by the one or more first cells but not spatially filtering transmissions of one or more desired signals by the second cell.

* * * * *

UNITED STATES PATENT AND TRADEMARK OFFICE
CERTIFICATE OF CORRECTION

PATENT NO. : 9,762,343 B2
APPLICATION NO. : 14/694604
DATED : September 12, 2017
INVENTOR(S) : Axmon et al.

Page 1 of 1

It is certified that error appears in the above-identified patent and that said Letters Patent is hereby corrected as shown below:

In the Specification

In Column 11, Line 9, delete "combining weight calculator 36" and insert -- combining weight calculator 38 --, therefor.

In Column 11, Lines 12-13, delete "combining weight calculator 36" and insert -- combining weight calculator 38 --, therefor.

In Column 11, Lines 13-14, delete "combining weight calculator 36" and insert -- combining weight calculator 38 --, therefor.

In Column 13, Line 21, delete "vector):" and insert -- vector: --, therefor.

In Column 13, Line 32, delete "matrix)" and insert -- matrix --, therefor.

In Column 14, Line 26, delete "$\theta_k^H C_k C_k^H \theta k=0.$" and insert -- $\theta_k^H C_k C_k^H \theta_k=0.$ --, therefor.

Signed and Sealed this
Twenty-sixth Day of May, 2020

Andrei Iancu
*Director of the United States Patent and Trademark Office*